US011097466B2

(12) United States Patent
Waatti et al.

(10) Patent No.: US 11,097,466 B2
(45) **Date of Patent: *Aug. 24, 2021**

(54) SELECTIVE ATTACHMENT OF A YARN STRUCTURE

(71) Applicant: NIKE, Inc., Beaverton, OR (US)

(72) Inventors: Todd A. Waatti, Battleground, WA (US); Yoav Sterman, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/657,936

(22) Filed: Oct. 18, 2019

(65) Prior Publication Data

US 2020/0047405 A1 Feb. 13, 2020

Related U.S. Application Data

(63) Continuation of application No. 14/935,904, filed on Nov. 9, 2015, now Pat. No. 10,471,654.

(51) Int. Cl.
*A43D 95/14* (2006.01)
*B29C 41/20* (2006.01)
(Continued)

(52) U.S. Cl.
CPC ............ *B29C 64/118* (2017.08); *B29C 48/02* (2019.02); *B29C 48/05* (2019.02); *B29C 48/266* (2019.02);
(Continued)

(58) Field of Classification Search
CPC ................ A43D 95/14; A44B 18/0049; A44B 18/0057; A44B 18/0076; B29C 41/20;
(Continued)

(56) References Cited

U.S. PATENT DOCUMENTS 6,153,034 A 11/2000 Lipsker
7,727,611 B2 6/2010 Ducauchuis
(Continued)

FOREIGN PATENT DOCUMENTS

CN 107443721 12/2017
DE 102005030906 1/2007
(Continued)

OTHER PUBLICATIONS

"Fibre Core" from RepRapWiki, last accessed and printed on May 5, 2014 from http://reprap.org/wiki/Fibre_Core, 5 pages.
(Continued)

*Primary Examiner* — Leo B Tentoni
(74) *Attorney, Agent, or Firm* — Klarquist Sparkman, LLP

(57) ABSTRACT

A method and system are disclosed. A method of printing onto a base having an upper surface spaced from a lower surface by a base thickness includes dispensing a yarn from a nozzle of a printing system and selectively attaching the yarn to a first attachment region. The step of dispensing the yarn includes dispensing a heat-moldable material and a melt-resistant material. The step of selectively attaching the yarn to the first attachment region includes moving the nozzle into the first attachment region. The step of moving the nozzle into the first attachment region reduces the base thickness by a prodding distance. The heat-moldable material bonds to the first attachment region.

18 Claims, 24 Drawing Sheets

160 162 218 118 151 212 152 230 210 148 157 159 144 150 204

160 162 224 220 118 151 152 226 222 210 148 202 157 159 144 150 204

(51) Int. Cl.

| | |
|---|---|
| ***B29C 65/70*** | (2006.01) |
| ***B29C 70/74*** | (2006.01) |
| ***B29C 70/78*** | (2006.01) |
| ***B41M 1/26*** | (2006.01) |
| ***B41M 1/30*** | (2006.01) |
| ***B41M 1/40*** | (2006.01) |
| ***B29C 64/118*** | (2017.01) |
| ***B33Y 10/00*** | (2015.01) |
| ***B29C 48/02*** | (2019.01) |
| ***B29C 48/285*** | (2019.01) |
| ***B29C 48/05*** | (2019.01) |
| ***B29C 48/25*** | (2019.01) |
| ***B29C 48/86*** | (2019.01) |
| *B29L 31/48* | (2006.01) |
| *B33Y 30/00* | (2015.01) |
| *B33Y 50/02* | (2015.01) |
| *B29C 64/40* | (2017.01) |
| *B29K 101/12* | (2006.01) |
| *B33Y 70/00* | (2020.01) |
| *A44B 18/00* | (2006.01) |
| *B29L 31/50* | (2006.01) |
| *B29L 31/00* | (2006.01) |

(52) U.S. Cl.

CPC ...... *B29C 48/2883* (2019.02); *B29C 48/2886* (2019.02); *B29C 48/865* (2019.02); *B29C 70/747* (2013.01); *B33Y 10/00* (2014.12); *A44B 18/0049* (2013.01); *A44B 18/0057* (2013.01); *A44B 18/0076* (2013.01); *B29C 64/40* (2017.08); *B29C 2795/007* (2013.01); *B29K 2101/12* (2013.01); *B29L 2031/48* (2013.01); *B29L 2031/50* (2013.01); *B29L 2031/727* (2013.01); *B29L 2031/729* (2013.01); *B33Y 30/00* (2014.12); *B33Y 50/02* (2014.12); *B33Y 70/00* (2014.12)

(58) Field of Classification Search

CPC ....... B29C 64/118; B29C 65/70; B29C 70/74; B29C 70/747; B29C 70/78; B29C 2795/007; B29L 2031/48; B29L 2031/50; B29L 2031/727; B29L 2031/729; B33Y 10/00; B41M 1/26; B41M 1/30; B41M 1/40

USPC ......... 264/129, 132, 259, 308; 156/277, 292

See application file for complete search history.

(56) References Cited

U.S. PATENT DOCUMENTS

| | | | | |
|---|---|---|---|---|
| 9,579,851 | B2 | 2/2017 | Thomas et al. | |
| 2005/0280184 | A1 | 12/2005 | Sayers et al. | |
| 2012/0096688 | A1 | 4/2012 | Cheng | |
| 2013/0337256 | A1 | 12/2013 | Farmer et al. | |
| 2014/0061974 | A1 | 3/2014 | Tyler | |
| 2014/0361460 | A1* | 12/2014 | Mark | B29C 64/118 264/248 |
| 2015/0196955 | A1* | 7/2015 | Naftalin | B29C 64/153 264/308 X |
| 2015/0314531 | A1 | 11/2015 | Mark et al. | |
| 2016/0219982 | A1 | 8/2016 | Waatti | |
| 2017/0015061 | A1 | 1/2017 | Lewicki et al. | |
| 2017/0129171 | A1* | 5/2017 | Gardner | B29C 64/118 |

FOREIGN PATENT DOCUMENTS

| | | |
|---|---|---|
| EP | 0 373 640 | 6/1990 |
| EP | 0 426 363 | 5/1991 |
| GB | 2296850 | 7/1996 |
| JP | 2503109 | 6/1996 |
| JP | H09137370 | 5/1997 |
| WO | WO 2013/022347 | 2/2013 |
| WO | WO 2013/033273 | 3/2013 |
| WO | WO 2014/015037 | 1/2014 |
| WO | WO 2015/009938 | 1/2015 |
| WO | WO 2016/028398 | 2/2016 |

OTHER PUBLICATIONS

International Search Report and Written Opinion, dated Nov. 22, 2016, of related PCT Application No. PCT/US2016/052905, 12 pages.

"Pultrusion" from Wikipedia last accessed and printed on May 5, 2014, from http://en.wikipedia.org/wiki/Pultrusion, 5 pages.

* cited by examiner 148
150
144
100
118
151
202
160
162

148
150
202
144
100
118
152
208
151
160
162

204
148
150
118
210
218
144
151
152
157
160
162

204
148
150
118
218
210
144
159
230
152
157
151
160
162
212

SELECTIVE ATTACHMENT OF A YARN STRUCTURE

CROSS REFERENCE TO RELATED APPLICATION

This application is a continuation of U.S. patent application Ser. No. 14/935,904, filed Nov. 9, 2015, now U.S. Pat. No. 10,471,654, which is incorporated herein by reference in its entirety.

BACKGROUND

The present embodiments relate generally to three-dimensional printing systems and methods.

Three-dimensional printing systems and methods may be associated with various technologies including fused deposition modeling (FDM), electron beam freeform fabrication (EBF), selective laser sintering (SLS) as well as other kinds of three-dimensional printing technologies.

Structures formed from three-dimensional printing systems can be used with objects formed by other manufacturing techniques. These include textile materials used in various articles of footwear and/or articles of apparel.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
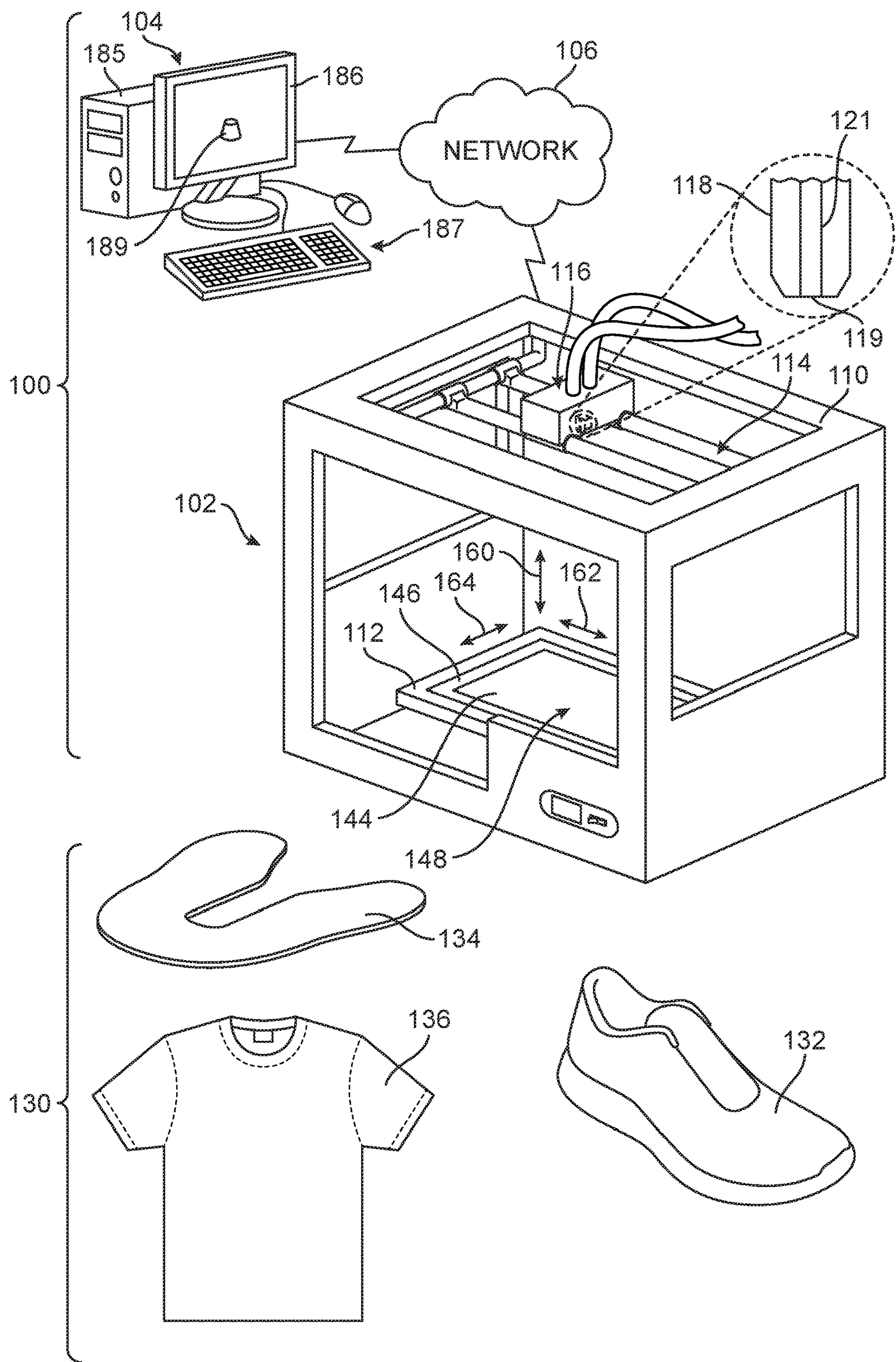
FIG. 1 is a schematic view of an embodiment of components of a three-dimensional printing system as well as several articles that may be used with the three-dimensional printing system.

In one aspect, a method of printing onto a base includes receiving the base and dispensing a yarn from a nozzle of a printing system. The base has an upper surface spaced from a lower surface by a base thickness. The upper surface includes a plurality of attachment regions for bonding a yarn to the base. The plurality of attachment regions includes a first attachment region. The yarn includes a heat moldable material and a melt-resistant material. The step of dispensing the yarn includes dispensing the heat moldable material in a liquid state. The step of dispensing the yarn includes dispensing the melt-resistant material in a solid state. The upper surface includes a plurality of attachment regions for bonding the yarn to the base. The method includes selectively attaching the yarn to an attachment region of the plurality of attachment regions by moving the nozzle along a first axis into the attachment region. The first axis is approximately normal to the upper surface. The step of moving the nozzle along the first axis into the first attachment region reduces the base thickness by a prodding distance. The heat moldable material bonds to the first attachment region during a transition of the heat moldable material from the liquid state to a solid state.

In another aspect, a method of printing onto a base includes positioning a nozzle of a printing system above an upper surface of the base and dispensing a yarn from the nozzle. The upper surface includes at least a first attachment region and a second attachment region for bonding the yarn to the base. The yarn includes a heat-moldable material and a melt-resistant material. The step of dispensing the yarn includes dispensing the heat-moldable material of the yarn in a liquid state. The step of dispensing the yarn includes dispensing the melt-resistant material of the yarn in a solid state. The method further includes selectively attaching the yarn to a first attachment region of the plurality of attachment regions by lowering the nozzle into direct contact with the first attachment region, thereby placing the yarn into direct contact with the first attachment region. The step of lowering the nozzle into direct contact with the first attachment region includes a transition of a first portion of the heat-moldable material of the yarn from the liquid state to a solid state. The first portion of the heat-moldable material bonds to the first attachment region during the transition of the first portion of the heat-moldable material. The method further includes selectively attaching the yarn to the second attachment region by moving the nozzle toward the second attachment region and by moving the nozzle into direct contact with the second attachment region, thereby placing the yarn into direct contact with the second attachment region. The step of moving the nozzle into direct contact with the second attachment region includes a transition of a second portion of the heat-moldable material of the yarn from the liquid state to a solid state. The second portion of the heat-moldable material bonds to the second attachment region during the transition of the second portion of the heat-moldable material.

In another aspect, a system for printing onto a base includes yarn, a heating system, nozzle assembly, and an actuating system. The yarn includes a heat-moldable material and a melt-resistant material. The heating system is configured to heat the yarn. The heating system heats the yarn such that the heat-moldable material is in a liquid state, and the melt-resistant material is in a solid state. The nozzle assembly is configured to dispense the yarn onto the base. The base has an upper surface and a lower surface. The nozzle assembly dispenses the heat-moldable material of the yarn in the liquid state and the melt-resistant material of the yarn in the solid state. The actuating system is configured to lower the nozzle assembly into direct contact with a first attachment region of the upper surface. The actuating system is also configured to raise the nozzle assembly away from the first attachment region of the upper surface. The actuating system is further configured to move the nozzle assembly along the upper surface of the base. A first portion of the heat-moldable material of the yarn is configured to transition from the liquid state to a solid state while in direct contact with the first attachment region. The first portion of the heat-moldable material bonds to the first attachment region during the transition of the first portion of the heat-moldable material. The melt-resistant material of the yarn is configured to remain as a continuous segment extending from the nozzle assembly to the first attachment region during the transition of the first portion of the heat-moldable material from the liquid state to the solid state.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, be within the scope of the embodiments, and be protected by the following claims.

FIG. 1 is a schematic view of an embodiment of three-dimensional printing system 100, also referred to simply as printing system 100 hereafter. FIG. 1 also illustrates several exemplary articles 130 that may be used with printing system 100. Referring to FIG. 1, printing system 100 may further include printing device 102, computing system 104, and network 106.

Embodiments may use various kinds of three-dimensional printing (or additive manufacturing) techniques. Three-dimensional printing, or "3D printing," includes various technologies that are used to form three-dimensional objects by depositing successive layers of material on top of one another. Exemplary 3D printing technologies that could be used include, but are not limited to, fused filament fabrication (FFF), electron beam freeform fabrication (EBF), direct metal laser sintering (DMLS), electron beam melting (EMB), selective laser melting (SLM), selective heat sintering (SHS), selective laser sintering (SLS), plaster-based 3D printing (PP), laminated object manufacturing (LOM), stereolithography (SLA), digital light processing (DLP) as well as various other kinds of 3D printing or additive manufacturing technologies known in the art.

In the embodiments shown in the figures, printing system 100 may be associated with fused filament fabrication (FFF), also referred to as fused deposition modeling. In the embodiment shown in FIG. 1, printing device 102 of printing system 100 uses fused filament fabrication to produce three-dimensional parts. An example of a printing device using fused filament fabrication (FFF) is disclosed in Crump, U.S. Pat. No. 5,121,329, filed Oct. 30, 1989 and titled "Apparatus and Method for Creating Three-Dimensional Objects," which application is hereby incorporated by reference and referred to hereafter as the "3D Objects" application. Embodiments of the present disclosure can make use of any of the systems, components, devices, and methods disclosed in the 3D Objects application.

Printing device 102 may include housing 110 that supports various systems, devices, components, or other provisions that facilitate the three-dimensional printing of objects. Although the exemplary embodiment depicts a particular rectangular box-like geometry for housing 110, other embodiments could use any housing having any geometry and/or design. The shape and size of the housing of a printing device could be varied according to factors including a desired footprint for the device, the size and shape of parts that may be formed within the printing device as well as possibly other factors. It will be understood that the housing of a printing device could be open or closed. For example, a printing device could be open to provide a frame with large openings. In another example, a printing device could be closed with glass or panels of solid material and a door.

In some embodiments, printing device 102 may include provisions to retain or hold a printed object (or a component supporting the printed object). In some embodiments, printing device 102 may include a table, platform, tray, or similar component to support, retain, and/or hold a printed object or an object onto which printed material is being applied. In the embodiment of FIG. 1, printing device 102 includes tray 112. In some embodiments, tray 112 may be fixed in place. In other embodiments, however, tray 112 could move. For example, in some cases, tray 112 may be configured to translate within housing 110 in one or more horizontal directions (e.g., directions along a horizontal axis), as well as in one or more vertical directions (e.g., directions along a vertical axis). As used herein, a horizontal axis may refer to an axis extending front to back and/or left to right with respect to housing 110. As used herein, a vertical axis may refer to an axis extending up and down within housing 110. Moreover, in some cases, tray 112 may be configured to rotate and/or tilt about one or more axes associated with tray 112. Thus, it is contemplated that in at least some embodiments, tray 112 may be moved into any desired relative configuration with a nozzle or print head of printing device 102.

In some embodiments, printing device 102 may include one or more systems, devices, assemblies, or components for delivering a printed material (or printed substance) to a target location. Target locations could include the surface of tray 112, a surface or portion of a partially printed structure, and/or a surface or portion of a non-printed structure or component. Provisions for delivering printed materials include, for example, print heads and nozzles. In the embodiment of FIG. 1, printing device 102 includes nozzle assembly 116.

Nozzle assembly 116 may include one or more nozzles that deliver a printed material to a target location. For purposes of clarity, the exemplary embodiment of FIG. 1 depicts a single nozzle 118 of nozzle assembly 116. However, in other embodiments, nozzle assembly 116 could be configured with any number of nozzles, which could be arranged in an array or any particular configuration. In embodiments including two or more nozzles, the nozzles could be configured to move together and/or independently. For example, in an embodiment of a printing system discussed below, a printing device could be configured with at least two nozzles that can move in an independent manner from one another.

Nozzle 118 may be configured with nozzle aperture 119 that can be opened and/or closed to control the flow of material exiting from nozzle 118. Specifically, nozzle aperture 119 may be in fluid communication with nozzle channel 121 that receives a supply of material from a material source (not shown) within printing device 102. For example, the supply of material may be a yarn structure composition. In other examples, the supply of material is a heat-moldable material. In at least some embodiments, a filament of material is provided as a coil, which may then be unwound and fed through nozzle 118 to be deposited at a target location. In some embodiments, a worm-drive may be used to push the filament into nozzle 118 at a specific rate (which may be varied to achieve a desired volumetric flow rate of material from nozzle 118). In other embodiments, a worm-drive is omitted. For example, in another embodiment, the material is pulled from the nozzle using an actuating system. It will be understood that in some cases, the supply of material could be provided at a location near nozzle 118, while in other embodiments the supply of material could be located at some other location of printing device 102 and fed via tubes, conduits, or other provisions, to nozzle assembly 116. For example, the supply of material could be in a portion of nozzle assembly 116.

In some embodiments, nozzle assembly 116 is associated with actuating system 114. Actuating system 114 may include various components, devices, and systems that facilitate the motion of nozzle assembly 116 within housing 110. In particular, actuating system 114 may include provisions to move nozzle assembly 116 in any horizontal direction and/or vertical direction to facilitate depositing a material so as to form a three-dimensional object. To this end, embodiments of actuating system 114 may include one or more tracks, rails, and/or similar provisions to hold nozzle assembly 116 at various positions and/or orientations within housing 110. Embodiments may also include any kinds of motors, such as a stepper motor or a servo motor, to move nozzle assembly 116 along a track or rail, and/or to move one or more tracks or rails relative to one another.

The printing system may move the nozzle in various directions and/or along one or more axes. In at least some embodiments, actuating system 114 may provide movement for nozzle assembly 116 in any of an x-axis, a y-axis, and a z-axis defined with respect to printing device 102. For example, the x-axis, the y-axis, and the z-axis defined with respect to printing device 102 may be a Cartesian coordinate system. In one embodiment, the printing system may be configured to move nozzle 118 in one or two directions along a first axis. For example, printing system 100 may include actuating system 114 configured to move nozzle 118 in one or two directions along first axis 160. In certain embodiments, the first axis is approximately normal to the upper surface and/or normal to the base. As used herein, an axis is approximately normal to a surface when it is within 10 degrees from perpendicular to the surface. For example, as shown, first axis 160 is normal to upper surface 148 and base 144. In some embodiments, the printing system may be configured to move the nozzle in one or two directions along a second axis. For example, printing system 100 may include actuating system 114 configured to move nozzle 118 in one or two directions along second axis 162. In certain embodiments, the second axis is approximately parallel to the upper surface and/or approximately parallel to the base. As used herein, an axis is approximately parallel to a surface when it is within 10 degrees from parallel to the surface. For example, as shown, second axis 162 is parallel to upper surface 148 and base 144. In some embodiments, the second axis is approximately perpendicular to the first axis. For example, as shown, second axis 162 is approximately perpendicular to first axis 160. Similarly, in various embodiments, the printing system may be configured to move the nozzle in one or two directions along a third axis. For example, printing system 100 may include actuating system 114 configured to move nozzle 118 in one or two directions along third axis 164. In certain embodiments, the third axis is parallel to the upper surface and/or parallel to the base. For example, third axis 164 may be parallel to upper surface 148 and base 144. In some embodiments, the third axis is perpendicular to the first axis and/or the third axis is perpendicular to the second axis. For example, third axis 164 may be perpendicular to first axis 160. In another example, third axis 164 may be perpendicular to second axis 162.

In certain embodiments, the printing system selectively moves the nozzle. In one embodiment, the printing system simultaneously moves the nozzle along three axes. For example, the printing system may move nozzle 118 along first axis 160 away from base 144 while simultaneously moving nozzle 118 along second axis 162 and/or along third axis 164. In other embodiments, a position along an axis is maintained while the printing system selectively moves the nozzle along another axis. In certain embodiments, the printing system may move the nozzle along the first axis toward or away from a base while simultaneously maintaining a base position of the nozzle along the second axis and along the third axis. For example, printing system 100 may move nozzle 118 along first axis 160 away from base 144 while simultaneously maintaining a base position of nozzle 118 along second axis 162 and along third axis 164 (see FIGS. 8-10 and 14-16). In some embodiments, the printing system may maintain a predetermined distance from the nozzle to the upper surface while simultaneously moving the nozzle parallel to the upper surface. For example, printing system 100 may maintain a predetermined distance between nozzle 118 and upper surface 148 along first axis 160 while simultaneously moving nozzle 118 along second axis 162 and/or along third axis 164.

It will be understood that for purposes of illustration, the components, devices, and systems of printing device 102 are shown schematically in FIG. 1. It will, therefore, be appreciated that embodiments may include additional provisions not shown, including specific parts, components, and devices that facilitate the operation of actuating system 114 and nozzle assembly 116. For example, actuating system 114 is shown schematically as including several tracks or rails, but the particular configuration and number of parts including actuating system 114 may vary from one embodiment to another.

In different embodiments, printing device 102 may use a variety of different materials for forming 3D parts, including, but not limited to, thermoplastics, high-density polyethylene, eutectic metals, rubber, clays (including metal clays), Room Temperature Vulcanizing silicone (RTV silicone), porcelain, as well as possibly other kinds of materials known in the art. As used herein, thermoplastics may include polyactic acid and acrylonitrile butadiene styrene. In embodiments where two or more different printed or dispensed materials are used to form a part, any two or more of the materials disclosed above could be used. In some embodiments, printing device 102 may use a yarn composition having one or more features described in Sterman et al., U.S. Patent Publication Number 2016-0053410 published on Feb. 25, 2016, titled "Thread Structure Composition and Method of Making," (now U.S. patent application Ser. No. 14/466,319, filed on Aug. 22, 2014), which is hereby incorporated by reference.

As discussed above, printing system 100 can include provisions to control and/or receive information from printing device 102. These provisions can include computing system 104 and network 106. Generally, the term "computing system" refers to the computing resources of a single computer, a portion of the computing resources of a single computer, and/or two or more computers in communication with one another. Any of these resources can be operated by one or more human users. In some embodiments, computing system 104 may include one or more servers. In some cases, a print server may be primarily responsible for controlling and/or communicating with printing device 102, while a separate computer may facilitate interactions with a user. As used herein, separate computer may refer to desktop, laptop, or tablet. Computing system 104 can also include one or more storage devices including, but not limited to, magnetic, optical, magneto-optical, and/or memory, including volatile memory and non-volatile memory.

In the exemplary embodiment of FIG. 1, computing system 104 may include central processing device 185, viewing interface 186, input devices 187, and software for designing a computer-aided design ("CAD") representation 189 of a printed structure. As used herein, viewing interface 186 may include a monitor or screen. As used herein, input devices 187 may include a keyboard and mouse. In at least some embodiments, the CAD representation 189 of a printed structure may include not only information about the geometry of the structure but also information related to the materials required to print various portions of the structure.

In some embodiments, computing system 104 may be in direct contact with printing device 102 via network 106. Network 106 may include any wired or wireless provisions that facilitate the exchange of information between computing system 104 and printing device 102. In some embodiments, network 106 may further include various components such as network interface controllers, repeaters, hubs, bridges, switches, routers, modems, and firewalls. In some cases, network 106 may be a wireless network that facilitates wireless communication between two or more systems, devices, and/or components of printing system 100. Examples of wireless networks include, but are not limited to, wireless personal area networks (including, for example, Bluetooth), wireless local area networks (including networks utilizing the IEEE 802.11 WLAN standards), wireless mesh networks, mobile device networks as well as other kinds of wireless networks. In other cases, network 106 could be a wired network including networks whose signals are facilitated by twister pair wires, coaxial cables, and optical fibers. In still other cases, a combination of wired and wireless networks and/or connections could be used.

In some embodiments, printed structures may be printed directly to one or more articles. The term "articles" is intended to include both articles of footwear and articles of apparel. As used throughout this disclosure, the terms "article of footwear" and "footwear" include any footwear and any materials associated with footwear, including an upper, and may also be applied to a variety of athletic footwear types, including baseball shoes, basketball shoes, cross-training shoes, cycling shoes, football shoes, tennis shoes, soccer shoes, and hiking boots, for example. As used throughout this disclosure, the terms "article of footwear" and "footwear" also include footwear types that are generally considered to be nonathletic, formal, or decorative, including dress shoes, loafers, sandals, slippers, boat shoes, and work boots.

While the disclosed embodiments are described in the context of footwear, the disclosed embodiments may further be equally applied to any article of clothing, apparel, or equipment that includes 3D printing. For example, the disclosed embodiments may be applied to hats, caps, shirts, jerseys, jackets, socks, shorts, pants, undergarments, athletic support garments, gloves, wrist/arm bands, sleeves, headbands, any knit material, any woven material, any nonwoven material, sports equipment, and the like. Thus, as used throughout this disclosure, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, and the like.

In an exemplary embodiment, printing device 102 may be configured to print one or more structures directly onto a portion of one of exemplary articles 130. Exemplary articles 130 include exemplary articles that may receive a printed structure directly from printing device 102, including article of footwear 132, which has a three-dimensional configuration, as well as upper 134, which has a flattened configuration. Exemplary articles 130 also include t-shirt 136. Thus, it will be understood that printing device 102 may be used to apply printed material to articles in three-dimensional configurations and/or flattened configurations.

In order to apply printed materials directly to one or more articles, printing device 102 may be capable of printing onto the surfaces of various kinds of materials. Specifically, in some cases, printing device 102 may be capable of printing onto the surfaces of various materials such as textile, natural fabric, synthetic fabric, knit, woven material, nonwoven material, mesh, leather, synthetic leather, polymer, rubber, and foam, or any combination of them, without the need for a release layer interposed between a substrate and the bottom of the printed material, and without the need for a perfectly or near-perfectly flat substrate surface on which to print. For example, the disclosed methods may include printing a resin, acrylic, thermoplastic material, or ink material onto a fabric, for example a knit material, where the material is adhered/bonded to the fabric and where the material does not generally delaminate when flexed, rolled, worked, or subject to additional assembly processes/steps. As used throughout this disclosure, the term "fabric" may be used to refer generally to materials chosen from any textile, natural fabric, synthetic fabric, knit, woven material, non-woven material, mesh, leather, synthetic leather, polymers, rubbers, and foam.

Although some embodiments may use printing device 102 to print structures directly onto the surface of a material, other embodiments may include steps of printing a structure onto a tray or release paper, and then joining the printed structure to an article in a separate step. In other words, in at least some embodiments, printed structures need not be printed directly to the surface of an article.

Printing system 100 may be operated as follows to provide one or more structures that have been formed using a 3D printing, or additive, process. Computing system 104 may be used to design a structure. This may be accomplished using some type of CAD software, or other kind of software. The design may then be transformed into information that can be interpreted by printing device 102 (or a related print server in communication with printing device 102). In some cases, the design may be converted to a 3D printable file, such as a stereolithography file (STL file).

Before printing, an article may be placed onto tray 112. Once the printing process is initiated (by a user, for example), printing device 102 may begin depositing material onto the article. This may be accomplished by moving nozzle 118 (using actuating system 114) to build up layers of a structure using deposited material. In embodiments where fused filament fabrication is used, material dispensed from nozzle 118 may be heated so as to increase the pliability of the heat-moldable material as it is deposited.

Although some of the embodiments shown in the figures depict a system using filament fused fabrication printing technologies, it will be understood that still other embodiments could incorporate one or more different 3D printing technologies. For example, printing system 100 may use a tack and drag printing method. Moreover, still other embodiments could incorporate a combination of filament fused fabrication and another type of 3D printing technique to achieve desired results for a particular printed structure or part.

Figure 2:
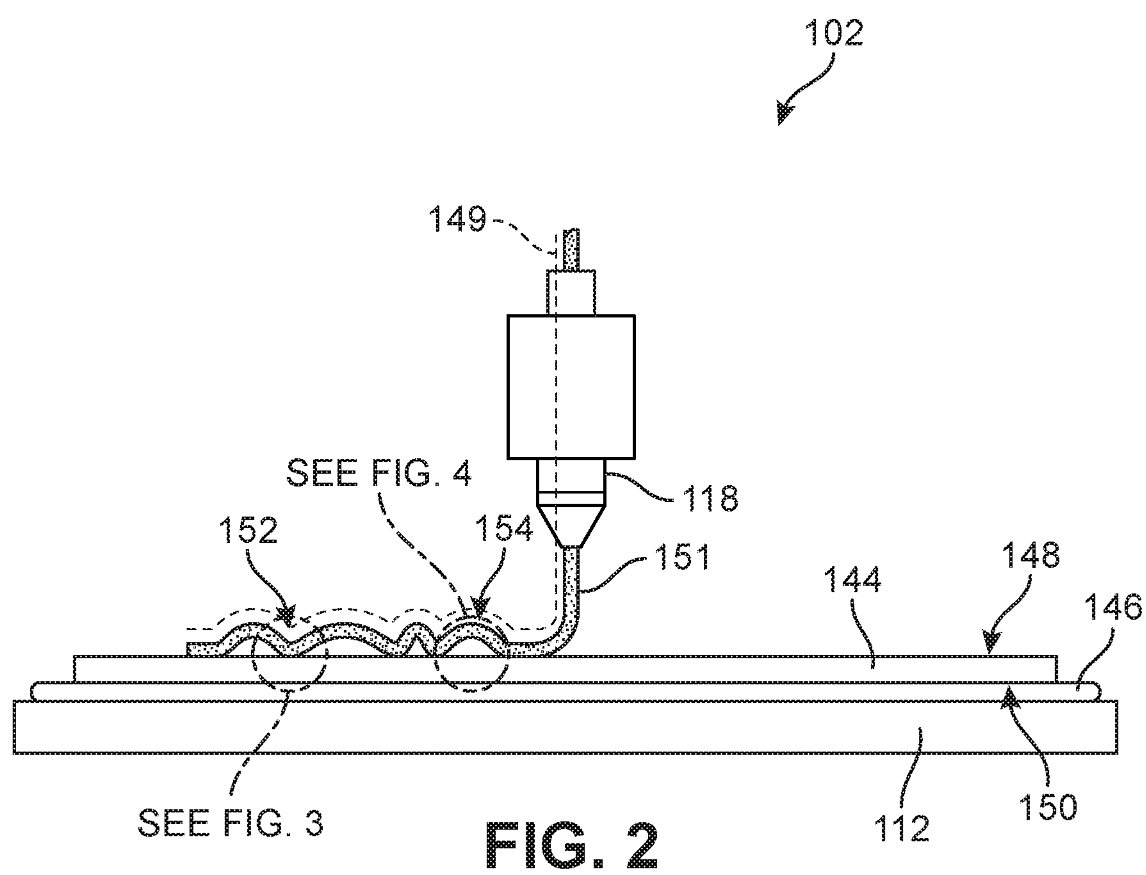
FIG. 2 is a schematic view of an embodiment of a printing device and a base.

As previously noted, printing device 102 may be configured to print directly onto various articles. Similarly, printing device 102 may be configured to print on various surface geometries (e.g., flat, curved, and/or irregular surfaces). For example, as shown in FIG. 2, tray 112 supports base 144 that is substantially planar. In other embodiments, base 144 may include one or more protrusions and/or one or more cavities. Moreover, printing device 102 may print on surfaces having various shapes. For example, as shown, tray 112 supports base 144 that is rectangular. In other embodiments, tray 112 may support a base that is circular, triangular, shaped like an upper for an article of footwear, and the like. As shown, base 144 includes upper surface 148 and lower surface 150.

In some instances, it is desirable to dampen an impact when the nozzle descends toward a tray. In one embodiment, printing system 100 may include an elastic layer to prevent tray 112 from impacting nozzle 118. In other embodiments, an elastic layer is omitted.

In those instances where an elastic layer is used, any suitable position may be used to dampen an impact when the nozzle descends toward a tray. In one embodiment, an elastic layer may be placed between a tray and a base. Referring to FIGS. 1-2, elastic layer 146 may be placed on tray 112 to separate tray 112 from base 144. In other embodiments, the elastic layer may be positioned in other locations.

In those instances where an elastic layer is used, any suitable number of layers may be used to dampen an impact when the nozzle descends toward a tray. In some embodiments, the lower surface directly contacts the elastic layer. For example, lower surface 150 directly contacts elastic layer 146. In some embodiments, another layer separates the lower surface and the elastic layer (not shown). In other embodiments, other layers may be used.

In those instances where an elastic layer is used, the elastic layer may have any suitable shape to facilitate a dampening of an impact when the nozzle descends toward a tray. Referring to FIG. 2, elastic layer 146 may have a rectangular shape. In some embodiments, the elastic layer may be circular (not shown). In some embodiments, the elastic layer may be triangular (not shown). In other embodiments, the elastic layer may have other shapes.

Some embodiments may be provisioned to permit the elastic layer to have a shape corresponding with another component of the printing system. In one embodiment, the elastic layer may have a shape corresponding to a base. Referring to FIG. 2, elastic layer 146 may have a shape corresponding with base 144. In some embodiments, the elastic layer may have a shape corresponding to a tray. Referring to FIG. 2, elastic layer 146 may have a shape corresponding with tray 112. In other embodiments, the elastic layer may have a shape corresponding to other components.

In those instances where an elastic layer is used, the elastic layer may have any suitable material to facilitate a dampening of an impact when the nozzle descends toward a tray. In some embodiments, the elastic layer is formed of an elastic material. As used herein, elastic material may include natural and/or synthetic rubber, nylon, polystyrene, Teflon, polyethylene, and the like. In other embodiments, the elastic layer may be formed of other materials.

In those instances where a nozzle is used to dispense a print material, any suitable material may be used. In one embodiment, the nozzle dispenses yarn. Referring to FIG. 2, nozzle 118 may dispense yarn 151. In other embodiments, the nozzle dispenses other material.

In those instances where the nozzle dispenses yarn, the yarn may be formed of any suitable material. Such yarn may include a yarn structure composition having one or more features described in Sterman et al., U.S. Patent Publication Number 2016-0053410, published on Feb. 25, 2016, titled "Thread Structure Composition and Method of Making,"

(now U.S. patent application Ser. No. 14/466,319, filed on Aug. 22, 2014), which is hereby incorporated by reference. For example, in some embodiments, yarn 151 may include a melt-resistant material and/or a heat-moldable material. As used herein, a heat-moldable material may be any material that is substantially moldable (or pliable) above a predetermined temperature, such as a glass transition temperature and/or a melting temperature. As used herein, the term "melt-resistant material" may refer to any material without a melting temperature (or any material with a melting temperature well above a predetermined threshold temperature). A melt-resistant material may include a material that combusts above a predetermined temperature such as paper. Another melt-resistant material may include metals that have a melting temperature significantly above a threshold temperature of about 500° C. In other embodiments, the yarn may be formed of other materials.

In those instances where the yarn is formed of heat-moldable material, the heat-moldable material may have any suitable property. In one embodiment, a heat moldable material has one or more thermal properties such as a glass-liquid transition ("glass transition") temperature and/or a melting temperature. For example, the heat-moldable material may be a thermoplastic material having a glass transition temperature and a melting temperature. In other embodiments, a heat-moldable material may have other properties.

In those instances where the yarn is formed of heat-moldable material, any suitable material may be used to form the heat-moldable material. As used herein, thermoplastic materials may include, for example, acrylic, nylon, polybenzimidazole, polyethylene, polypropylene, polystyrene, polyvinyl chloride, polytetrafluoroethylene (TEFLON), and the like. In other embodiments, a heat-moldable material may be formed of other materials.

In those instances where the yarn is formed of melt-resistant material, any suitable melt-resistant material may be used. In one embodiment, melt-resistant materials may include materials that are associated with yarns and strings used in forming textiles. For example, the melt-resistant material may be cotton. Additionally, exemplary materials of melt-resistant materials may include wool, flax, and cotton, as well as other one-dimensional materials. Melt-resistant materials may be formed using various sources of yarn material. Such sources may include animal, plant, mineral, and synthetic sources. Animal material may include, for example, hair, animal fur, animal skin, and silk. Plant material may include, for example, grass, rush, hemp, and sisal. Mineral material may include, for example, basalt fiber, glass fiber, and metal fiber. Synthetic yarns may include, for example, polyester, aramid, acrylic, and carbon fiber. In other embodiments, a melt-resistant material may be formed of other materials.

In the embodiment shown in FIGS. 2-5, yarn 151 may be seen to comprise a strand of melt-resistant material as well as a strand of heat-moldable material. Specifically, melt-resistant material 158 (see FIG. 3) and heat-moldable material 156 (see FIG. 3) may be wound around one another to form the composite yarn structure (or composite thread structure). Thus, as described in further detail below, melt-resistant material 158 may provide tensile strength and prevent adjacent segments of yarn 151 from separating while heat-moldable material 156 may act to fuse yarn 151 to an underlying substrate.

In some instances, it is desirable to selectively attach the yarn onto the base to allow for the yarn to have any number attachments to a base. In some embodiments, the yarn is attached to a base at an attachment region of a base and unattached to a base at an unattached region of the base. Referring to FIG. 2, upper surface 148 may include attachment region 152 and unattached region 154. In other embodiments, the yarn may be attached to the base differently.

Some embodiments may be provisioned to permit the yarn to have segments of various sizes to permit the printing of various yarn structures onto a base. In one embodiment, the yarn may comprise a single continuous segment. In other embodiments, the yarn may comprise multiple discrete segments.

In those instances where the yarn comprises a single continuous segment, the continuous segment may extend over any suitable distance. In some embodiments, a continuous segment of the yarn may extend over some of an upper surface of the base. In other embodiments, a continuous segment extends over other surfaces.

In those instances where the yarn comprises a continuous segment, the continuous segment may extend over various regions of the upper surface of the base. In some embodiments, a continuous segment of the yarn may extend from the nozzle assembly over an attachment region of the base. Referring to FIG. 2, continuous segment 149 of yarn 151 may extend from nozzle 118 over attachment region 152 of base 144. In some embodiments, a continuous segment of the yarn may extend from the nozzle assembly over an unattached region of the base. Referring to FIG. 2, continuous segment 149 of yarn 151 may extend from nozzle 118 over unattached region 154 of base 144. In other embodiments, a continuous segment of the yarn may extend over other regions of the upper surface of the base.

In those instances where the yarn has a continuous segment extending over various regions of the upper surface of the base, the continuous segment may extend over any number of regions of the upper surface of the base. In some embodiments, the continuous segment may extend over multiple attachment regions (see FIG. 16). In some embodiments, the continuous segment may extend over multiple unattached regions (see FIG. 16). In some embodiments, the continuous segment may extend over one or more unattached regions and one or more attached regions (see FIG. 16). In other embodiments, a continuous segment of the yarn may extend over other numbers of regions of the upper surface of the base.

In those instances where the yarn has a melt-resistant material, the melt-resistant material may extend over any suitable distance. In some embodiments, the melt-resistant material of the yarn may extend over an upper surface of the base. In other embodiments, the melt-resistant material may extend over other surfaces.

Figure 3:
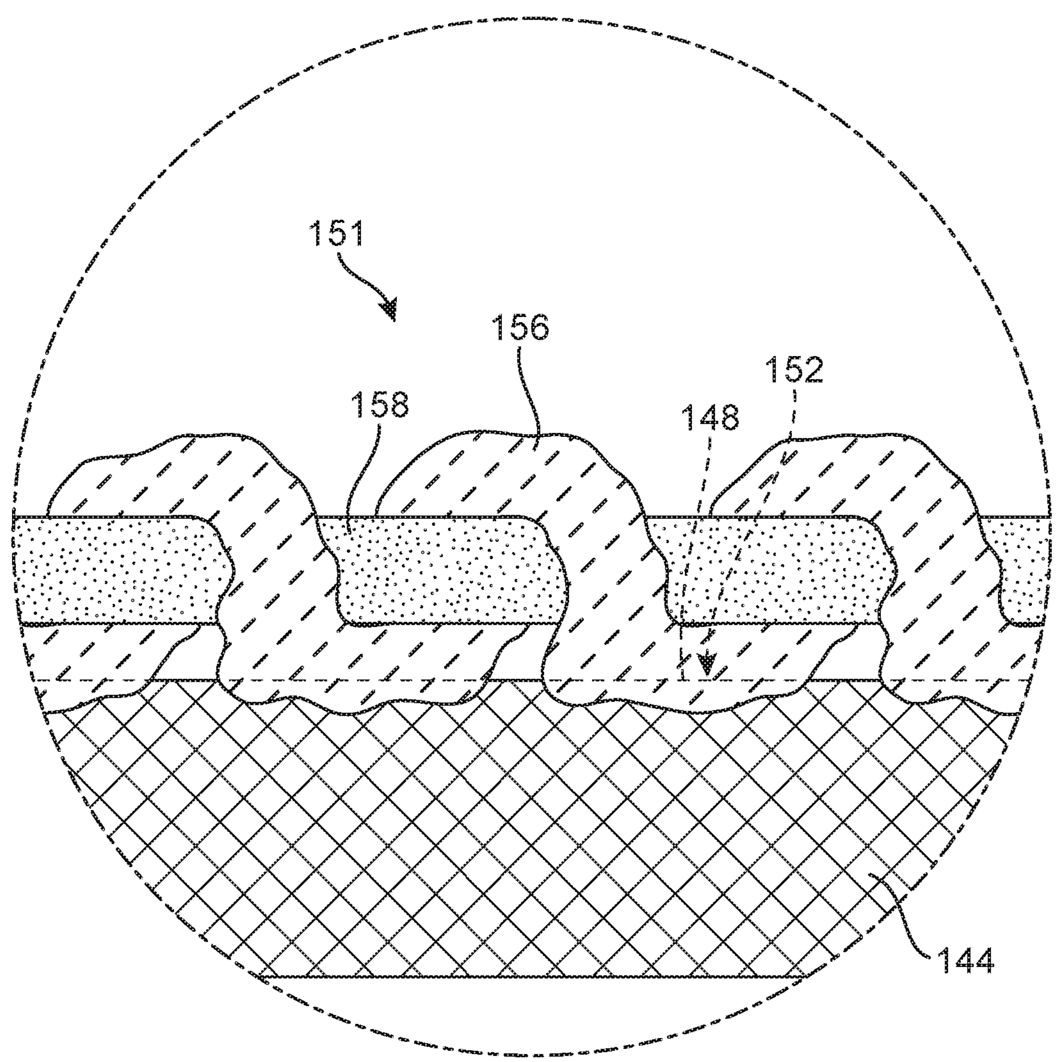
FIG. 3 is a schematic view of an attachment region, in accordance with an exemplary embodiment.
Figure 4:
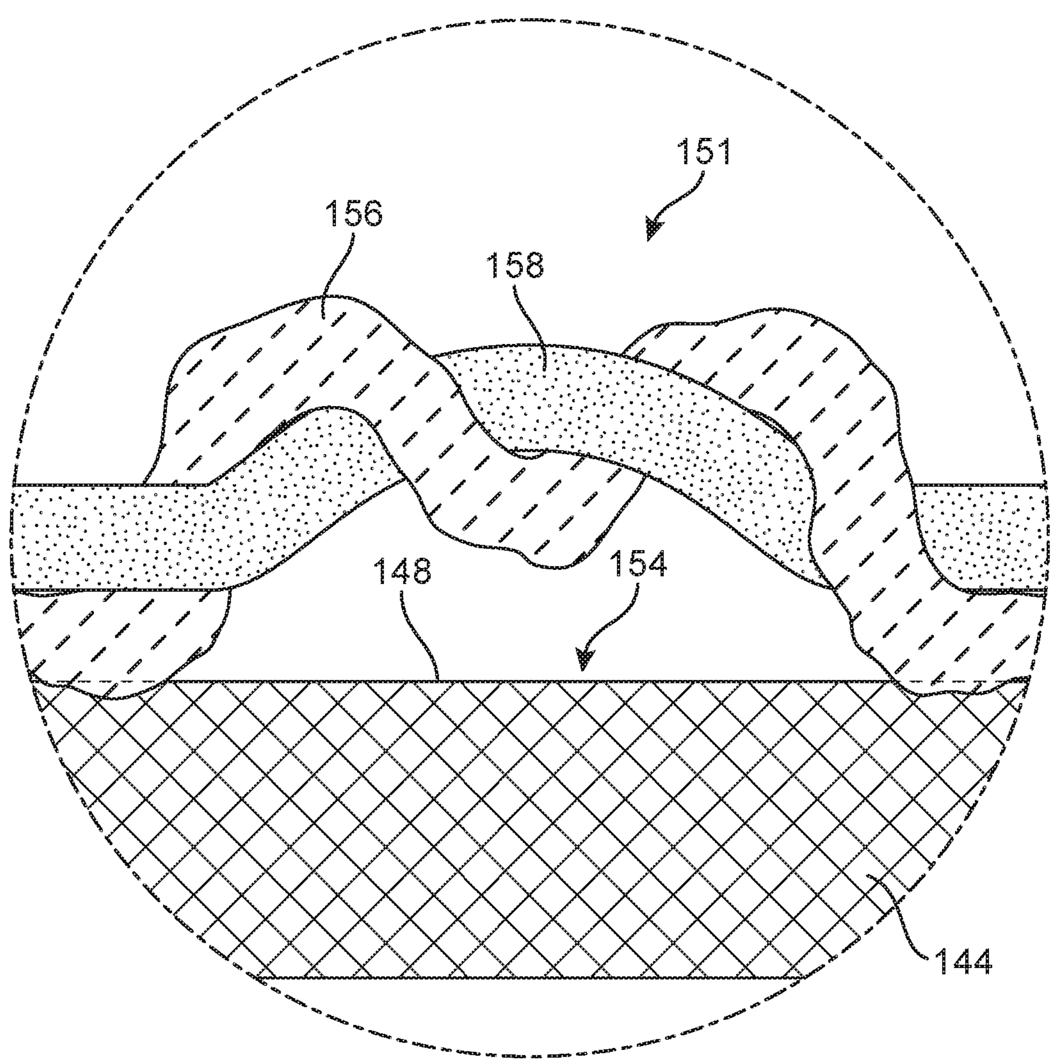
FIG. 4 is a schematic view of an unattached region, in accordance with an exemplary embodiment.

In those instances where the melt-resistant material of the yarn may extend over an upper surface of the base, the melt-resistant material may extend over various regions of the upper surface of the base. In some embodiments, the melt-resistant material of the yarn may extend from the nozzle assembly over an attachment region of the base. Referring to FIG. 3, melt resistant material 158 of continuous segment 149 (see FIG. 2) of yarn 151 may extend from nozzle 118 (see FIG. 2) over attachment region 152 of base 144. In some embodiments, the melt-resistant material of the yarn may extend from the nozzle assembly over an unattached region of the base. Referring to FIG. 4, melt-resistant material 158 of continuous segment 149 of yarn 151 may extend from nozzle 118 over unattached region 154 of base

144. In other embodiments, a melt resistant material 158 of the yarn may extend over other regions of the upper surface of the base.

In those instances where the yarn has a melt-resistant material extending over various regions of the upper surface of the base, the melt-resistant material may extend over any number of regions of the upper surface of the base. In some embodiments, the melt-resistant material may extend over multiple attachment regions (see FIG. 16). In some embodiments, the melt-resistant material may extend over multiple unattached regions (see FIG. 16). In some embodiments, the melt-resistant material may extend over one or more unattached regions and one or more attached regions (see FIG. 16). In other embodiments, the melt-resistant material of the yarn may extend over other numbers of regions of the upper surface of the base.

Some embodiments may be provisioned to permit the yarn to be attached onto a base. In one embodiment, the yarn may be attached to the base using a heat-moldable material. In other embodiments, the yarn may be attached to the base using other materials and/or methods.

In those instances where a heat-moldable material is used to attach the yarn to the base, the heat-moldable material may bond to various portions of the base. In some embodiments, a heat-moldable material may bond directly to the attachment region. Referring to FIG. 3, heat-moldable material 156 of yarn 151 may directly bond to attachment region 152. In other embodiments, the heat-moldable material may bond to other portions of the base.

In those instances where a heat-moldable material is used to attach the yarn to the base, the heat-moldable material may bond to various portions of the yarn. In some embodiments, a heat-moldable material may bond directly to the melt-resistant material. Referring to FIG. 3, heat-moldable material 156 of yarn 151 may directly bond to melt-resistant material 158. In other embodiments, the heat-moldable material may bond to other portions of the yarn.

In those instances where the yarn is unattached to a base at an unattached region of the base, various methods may be used to permit the yarn to separate from the base. In some embodiments, the yarn may be spaced apart from the unattached region. In some embodiments, the yarn may be detached from the unattached region. As used herein, materials may be detached if the materials may be moved away from each other without breaking a bond between the materials and/or without damaging either material.

In those instances where the yarn is spaced apart from the unattached region of the upper surface of the base, any suitable portion of the yarn may be spaced apart from the unattached region. In some embodiments, the heat-moldable material of the yarn may be spaced apart from the unattached region. Referring to FIG. 4, heat-moldable material 156 of yarn 151 may be spaced from unattached region 154. In some embodiments, the melt-resistant material of the yarn may be spaced apart from the unattached region. Referring to FIG. 4, melt-resistant material 158 of yarn 151 may be spaced from the unattached region 154. In other embodiments, other portions of the yarn may be spaced apart from the unattached region of the upper surface of the base.

In those instances where the heat-moldable material of the yarn is spaced apart from the unattached region of the upper surface of the base, the heat-moldable material may be attached to various portions of the yarn. In some embodiments, the heat-moldable material may bond to the melt-resistant material of the yarn while being spaced apart from the unattached region. Referring to FIG. 4, heat-moldable material 156 of yarn 151 may bond to the melt-resistant material 158 of yarn 151 while yarn 151 is spaced apart from unattached region 154. In other embodiments, the heat moldable material may be attached to other portions of the yarn while the yarn is spaced apart from an unattached region.

In those instances where the yarn is detached from the unattached region of the upper surface of the base, any suitable portion of the yarn may be detached from the unattached region. In some embodiments, a heat-moldable material may be detached from the unattached region of the upper surface of the base. Referring to FIG. 4, heat-moldable material 156 is detached from unattached region 154. In other embodiments, other portions of the yarn may be detached from the unattached region of the upper surface of the base.

In those instances where the heat-moldable material of the yarn is detached from the unattached region of the upper surface of the base, the heat-moldable material may be attached to various portions of the yarn. In some embodiments, the heat-moldable material may bond to the melt-resistant material of the yarn while being detached from the unattached region. Referring to FIG. 4, heat-moldable material 156 of yarn 151 may bond to the melt-resistant material 158 of yarn 151 while yarn 151 is detached from unattached region 154. In other embodiments, the heat-moldable material may be attached to other portions of the yarn while the yarn is detached from an unattached region.

Figure 5:
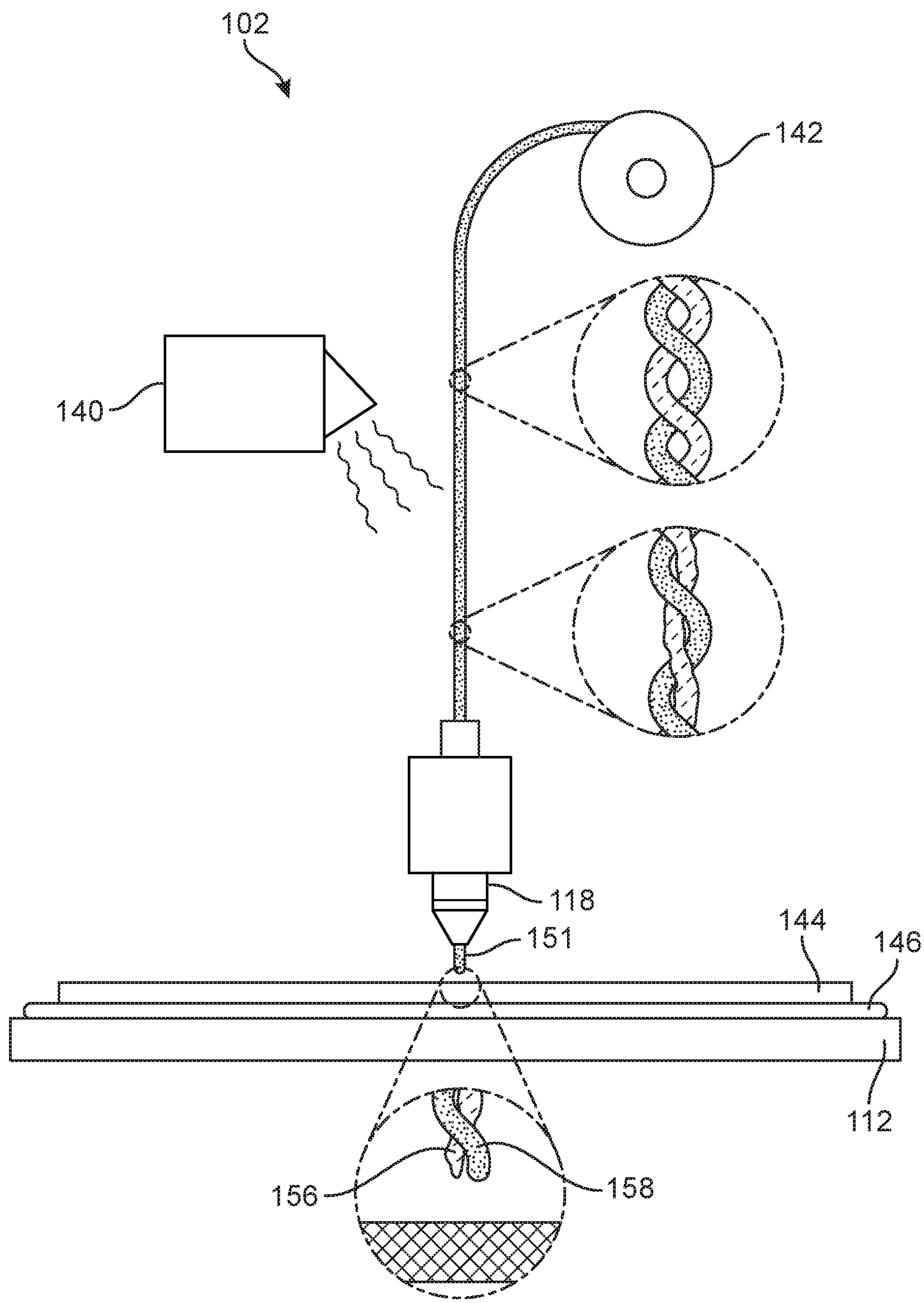
FIG. 5 is a schematic view of an embodiment of a printing device.

FIG. 5 is an alternative view of printing device 102, in accordance to an exemplary embodiment. As shown printing device 102 includes tray 112, nozzle 118, heating system 140, and material source 142. In other embodiments, printing device 102 may have other components.

In those instances where the printing device includes a heating system, the heating system may be configured to provide any suitable temperature to the yarn of material source 142. In some embodiments, heating system 140 may provide a temperature within a particular temperature range. For example, heating system 140 may provide a temperature of more than 500° C. In another example, heating system 140 may provide a temperature of more than 300° C. In a further example, heating system 140 may provide a temperature of more than 230° C. In one example, heating system 140 may provide a temperature of between 110° C. and 200° C. In other embodiments, the heating system may provide other temperatures.

In those instances where the printing device includes a material source, the material source may be configured to facilitate the dispensing of print material using any suitable means. In one embodiment, the material source may include a worm-drive to push print material into the nozzle (not shown). In some embodiments, the material source may omit a worm-drive to push print material into the nozzle. Referring to FIG. 5, material source 142 may omit a worm-drive. In other embodiments, material source 142 may include various drives or pumps to dispense material from material source 142 to and away from nozzle 118. In some embodiments, the material source may be configured to facilitate the dispensing of print material using other components and/or methods.

In some embodiments, the printing device may use an actuating system to facilitate the dispensing of print material. Referring to FIG. 5, printing device 102 may use actuating system 114 (see FIG. 1) to provide material from material source 142 to nozzle 118 for dispensing yarn 151 onto the base. In other embodiments, the material source may be configured to facilitate the dispensing of print material using other components and/or methods.

In those instances where a material source is used, any suitable material may be provided to a nozzle. In some embodiments, the material source may include yarn having one or more features as described in Sterman et al., U.S. Patent Publication Number 2016-0053410, published on Feb. 25, 2016, titled “Thread Structure Composition and Method of Making,” (now U.S. patent application Ser. No. 14/466,319, filed on Aug. 22, 2014), which is hereby incorporated by reference. In some embodiments, the yarn may include at least one yarn formed of a melt-resistant material. In some embodiments, material source 142 is substantially formed of a heat-moldable material. In other embodiments, the yarn may be different.

In those instances where a heating system is used, the heating system may be permitted to heat at least a portion of the print material into a liquid state. In some embodiments, the heating system is configured to heat a heat-moldable material of the yarn into a liquid state. Referring to FIG. 5, heating system 140 may be configured to heat heat-moldable material 156 of yarn 151 to transition heat-moldable material 156 into a liquid state. In other embodiments, the heating system is configured to heat other material of the yarn into a liquid state.

In those instances where a heating system is used to heat the heat-moldable material of the yarn into a liquid state, an actuating system may facilitate a bonding of the heat-moldable material with a base. In some embodiments, the actuating system moves a nozzle into an attachment region of an upper surface of a base to facilitate a bonding of the heat-moldable material with a base (see FIGS. 6-17). In other embodiments, the actuating system may facilitate a bonding of the heat-moldable material with a base using other components and/or methods.

In some embodiments, the heat-moldable material may bond with the base. In some embodiments, the heat-moldable material may transition from the liquid state to a solid state to bond with an attachment region (see FIG. 3). In other embodiments, the heat-moldable material may bond with an attachment region using other components and/or methods.

FIGS. 6-17 illustrate a method of selectively attaching the yarn onto a base, in accordance to an exemplary embodiment. The methods illustrated may be implemented on various devices, may utilize various materials, use different types of bases, and the like. Accordingly, the methods illustrated in FIGS. 6-17 are for illustrative purposes only.

Figure 6:
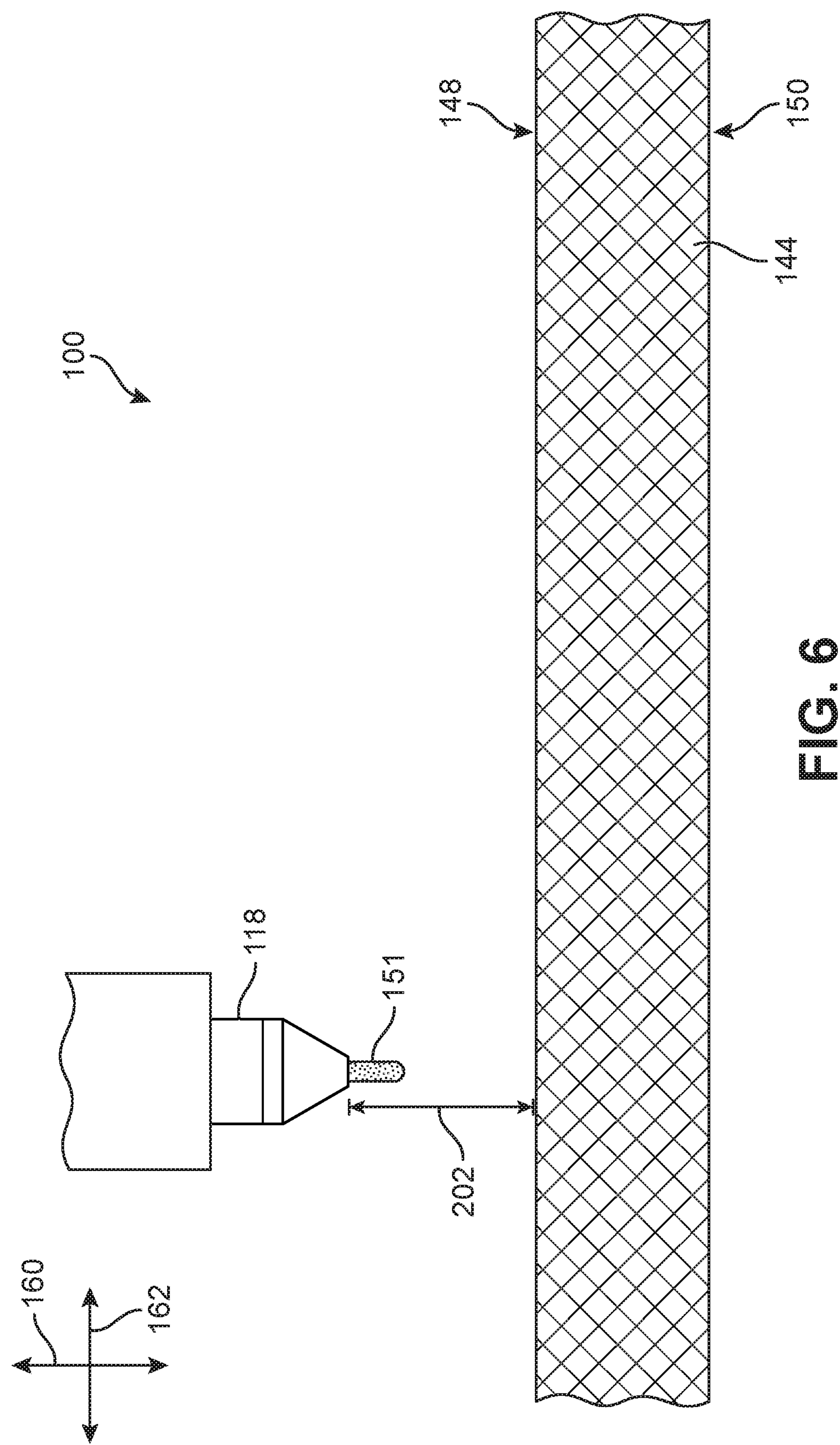
FIG. 6 is a schematic view of a process of positioning a nozzle above an upper surface of a base, in accordance with an exemplary embodiment.

Some embodiments can be provisioned to prevent portions of yarn from contacting and/or bonding with unattached regions. In one embodiment, the printing system may maintain a predetermined distance between the nozzle and the upper surface to prevent portions of the yarn from bonding with unattached regions. Referring to FIG. 6, printing system 100 may maintain predetermined distance 202 between nozzle 118 and upper surface 148. As such, yarn 151 may not be pushed into upper surface 148 to cause yarn 151 to bond with upper surface 148. In other embodiments, portions of yarn may be prevented from contacting and/or bonding with unattached regions by other methods.

In those instances where the printing system may maintain a predetermined distance between the nozzle and the upper surface to prevent portions of the yarn from bonding with unattached regions, the predetermined distance may be any suitable distance to facilitate detachment of the yarn from unattached regions. In some embodiments, the predetermined distance is greater than thickness 205 (see FIG. 9) of the yarn. In some embodiments, the predetermined distance is greater than the thickness of the melt-resistant material of the yarn. In some embodiments, the predetermined distance is greater than the thickness of the melt-resistant material of the yarn. In other embodiments, the predetermined distance may be different.

In those instances where the predetermined distance is greater than the thickness of the yarn, the predetermined distance may be greater than the thickness of the yarn by any amount. In some embodiments, the predetermined distance is greater than one and a half times the thickness of the yarn. In some embodiments, the predetermined distance is greater than two times the thickness of the yarn. In some embodiments, the predetermined distance is greater than two and a half times the thickness of the yarn. In some embodiments, the predetermined distance is greater than three times the thickness of the yarn. In other embodiments, the predetermined distance may be greater than the thickness of the yarn by other amounts.

In those instances where the predetermined distance is greater than the thickness of the melt-resistant material of the yarn, the predetermined distance may be greater than the thickness of the melt-resistant material of the yarn by any amount. In some embodiments, the predetermined distance is greater than one and a half times the thickness of the melt-resistant material of the yarn. In some embodiments, the predetermined distance is greater than two times the thickness of the melt-resistant material of the yarn. In some embodiments, the predetermined distance is greater than two and a half times the thickness of the melt-resistant material of the yarn. In some embodiments, the predetermined distance is greater than three times the thickness of the melt-resistant material of the yarn. In other embodiments, the predetermined distance may be greater than a thickness of a melt resistant material of the yarn by other amounts.

In those instances where the predetermined distance is greater than the thickness of the heat-moldable material of the yarn, the predetermined distance may be greater than the thickness of the heat-moldable material of the yarn by any amount. In some embodiments, the predetermined distance is greater than one and a half times the thickness of the heat-moldable material of the yarn. In some embodiments, the predetermined distance is greater than two times the thickness of the heat-moldable material of the yarn. In some embodiments, the predetermined distance is greater than two and a half times the thickness of the heat-moldable material of the yarn. In some embodiments, the predetermined distance is greater than three times the thickness of the heat-moldable material of the yarn. In other embodiments, the predetermined distance may be greater than the thickness of the heat-moldable material of the yarn by other amounts.

Figure 7:
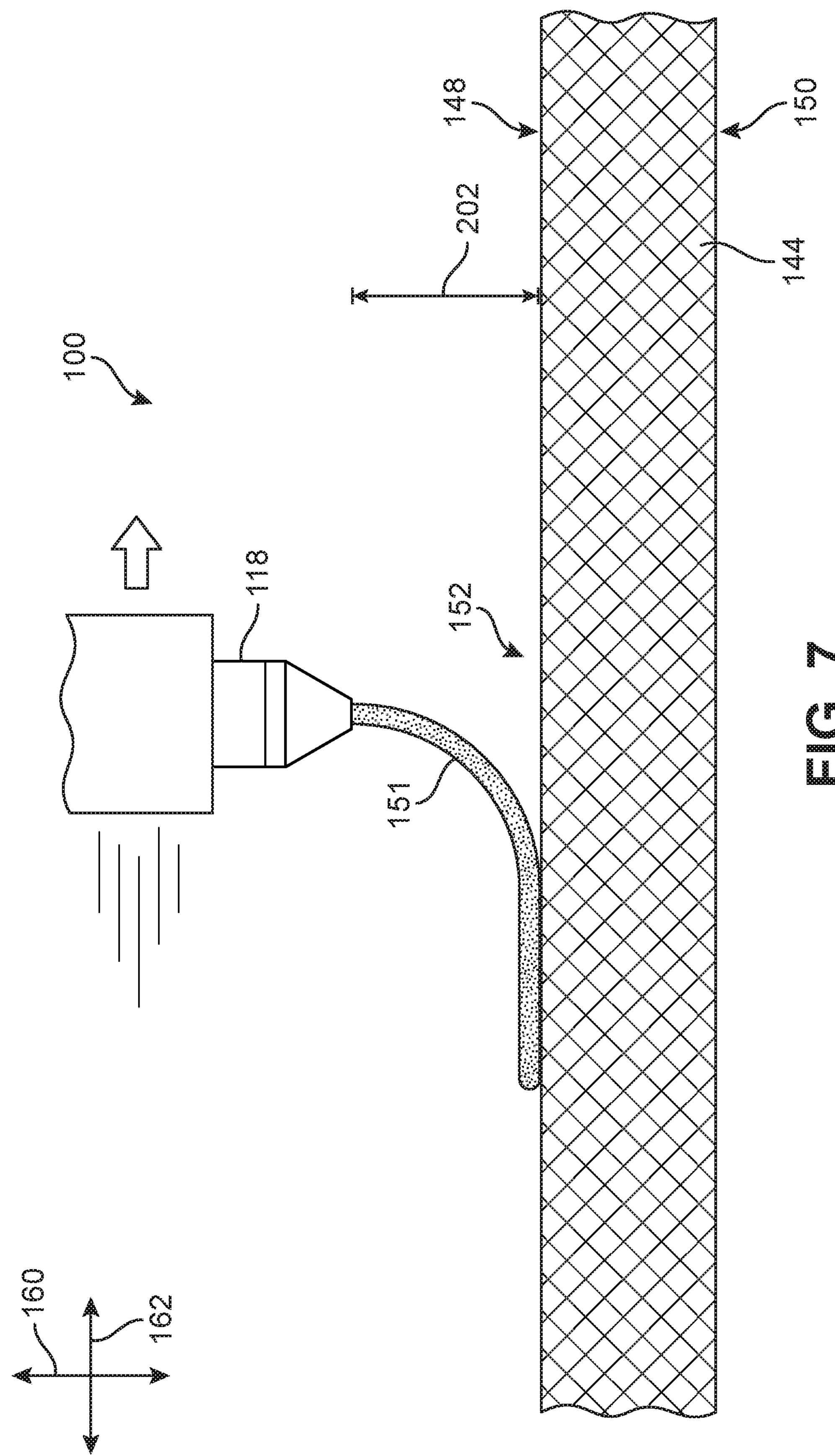
FIG. 7 is a schematic view of a process of moving a nozzle along an upper surface of a base, in accordance with an exemplary embodiment.

In certain instances, it is desirable to prevent portions of the yarn from bonding with an unattached region of an upper surface of a base. In one embodiment, the nozzle is moved toward an attachment region while maintaining a predetermined distance between the nozzle and an upper surface of a base to prevent portions of the yarn from bonding with an unattached region of an upper surface of a base. Referring to FIG. 7, printing system 100 may move nozzle 118 along upper surface 148 toward attachment region 152 while maintaining predetermined distance 202 between nozzle 118 and upper surface 148. In the example, yarn 151 may not be pushed into upper surface 148 to cause yarn 151 to bond with upper surface 148, thereby allowing for one or more unattached regions.

Figure 8:
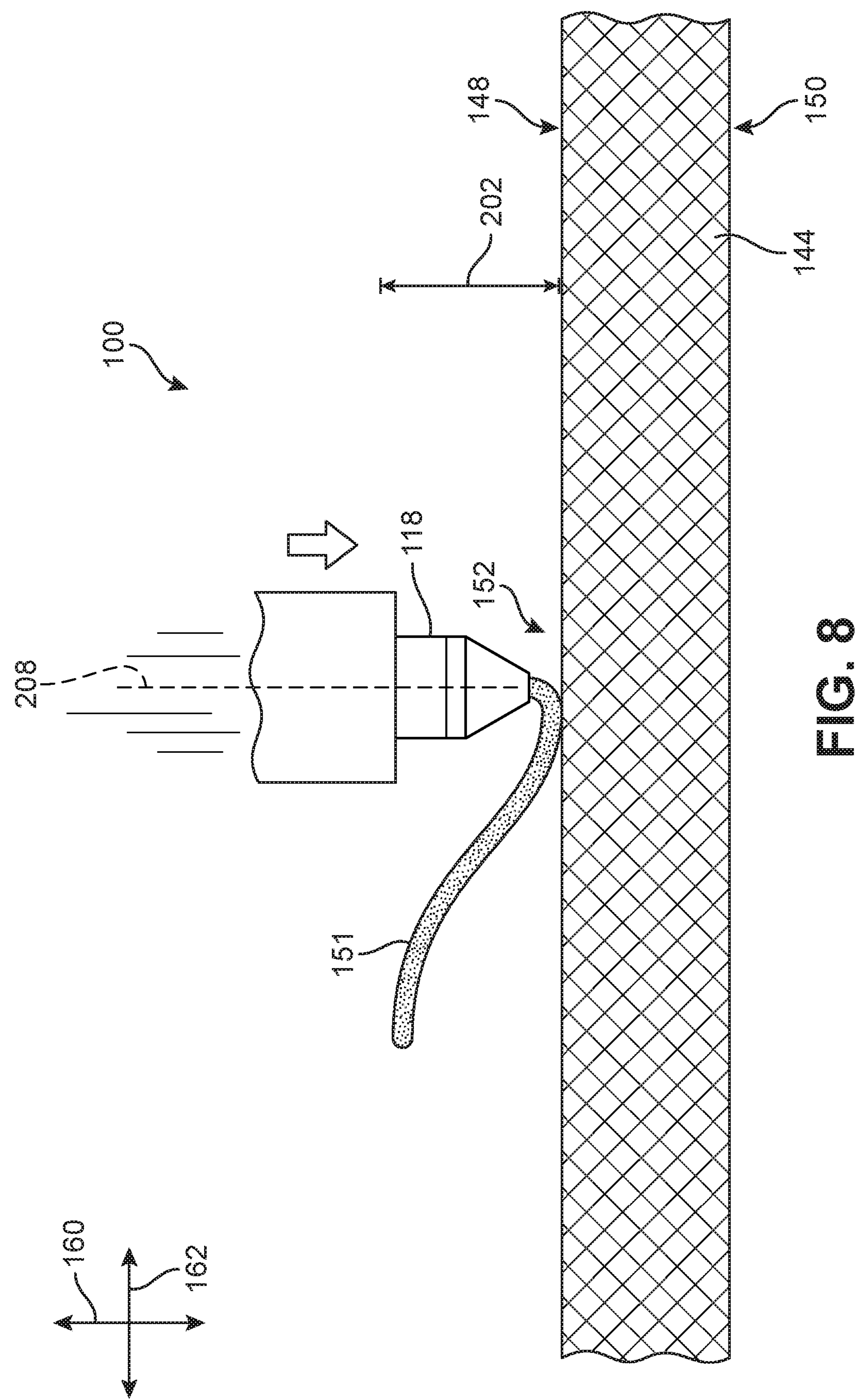
FIG. 8 is a schematic view of a process of lowering a nozzle into an attachment region of an upper surface of a base, in accordance with an exemplary embodiment.

Some embodiments can include provisions for selectively attaching some segments of the yarn to the base. In some embodiments, the printing system lowers the nozzle from the predetermined distance into the attachment region to facilitate an attachment of the yarn to a base. Referring to FIG. 8, printing system 100 lowers nozzle 118 (i.e., printing system 100 causes nozzle 118 to descend) from predetermined distance 202 into attachment region 152. As used herein, lower and raise may refer to any suitable movement that is normal to a base. It should be understood that, in some embodiments, a base may be positioned sideways or otherwise angled to a ground plane (e.g., Earth's surface) and that, in such embodiments, lower and raise may refer to a movement parallel to the ground plane as well as a movement perpendicular to the ground plane. In some embodiments, the printing system lowers the nozzle from the predetermined distance into direct contact with the attachment region to facilitate an attachment of the yarn to the base. Referring to FIG. 8, printing system 100 lowers nozzle 118 from predetermined distance 202 into direct contact with attachment region 152. In other embodiments, the yarn is attached to a base by other methods.

Figure 9:
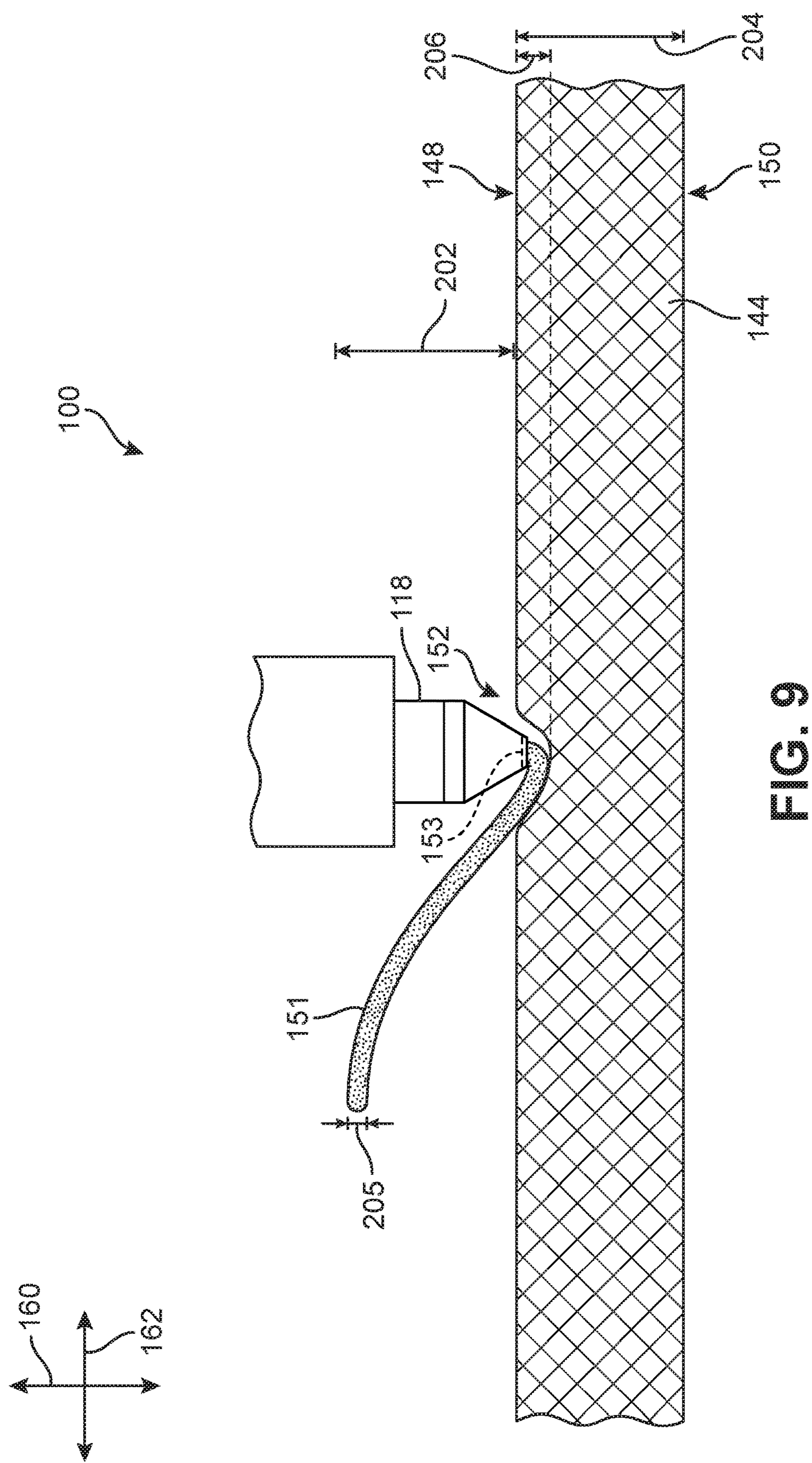
FIG. 9 is a schematic view a process of lowering a nozzle into the attachment region of FIG. 8 to reduce a base thickness of a base, in accordance with an exemplary embodiment.

In those instances where the printing system lowers or moves the nozzle from the predetermined distance into the attachment region or into direct contact with the attachment region to facilitate an attachment of the yarn to a base, the nozzle may have a tip area having any surface area. In some embodiments, the nozzle has a tip area approximately equal to a surface area of the attachment region. Referring to FIGS. 8 and 9, nozzle 118 has tip area 153 approximately equal to surface area 155 of the attachment region 152. As used herein, surface areas may be approximately equal when the difference of the areas is less than 20 percent of either area. In some embodiments, surface areas may be approximately equal when the difference of the areas is less than 10 percent of either area. In some embodiments, surface areas may be approximately equal when the difference of the areas is less than 5 percent of either area. In other embodiments, the nozzle may have other tip areas.

In those instances where the printing system lowers the nozzle from the predetermined distance into the attachment region or into direct contact with the attachment region to facilitate an attachment of the yarn to a base, the nozzle may maintain a position along an upper surface of a base. In some embodiments, the nozzle may descend along the first axis into the attachment region while maintaining a base position along a second axis. Referring to FIGS. 8 and 9, printing system 100 may lower nozzle 118 along first axis 160 into attachment region 152 while maintaining base position 208 along second axis 162. In some embodiments, the nozzle may descend along the first axis into the attachment region while maintaining a base position along a third axis. Referring to FIGS. 8 and 9, printing system 100 may move or lower nozzle 118 along first axis 160 into attachment region 152 while maintaining base position 208 along third axis 164 (see FIG. 1). In some embodiments, the nozzle may descend along the first axis into the attachment region while maintaining a base position along a second axis and along a third axis. Referring to FIGS. 8 and 9, printing system 100 may lower nozzle 118 along first axis 160 into attachment region 152 while maintaining base position 208 along second axis 162 and along third axis 164. In other embodiments, the nozzle may maintain other positions.

In those instances where the printing system lowers or moves the nozzle from the predetermined distance into the attachment region or into direct contact with the attachment region to facilitate an attachment of the yarn to a base, the base thickness between the upper surface and the lower surface may be reduced. In some embodiments, the printing system may lower the nozzle from the predetermined distance into the attachment region such that the base thickness between the upper surface and the lower surface is reduced by a prodding distance. Referring to FIG. 9, printing system 100 may move or lower nozzle 118 from predetermined distance 202 into attachment region 152 such that base thickness 204 between attachment region 152 of upper surface 148 and lower surface 150 is reduced by prodding distance 206. In other embodiments, the base thickness between the upper surface and the lower surface may not be reduced.

Figure 10:
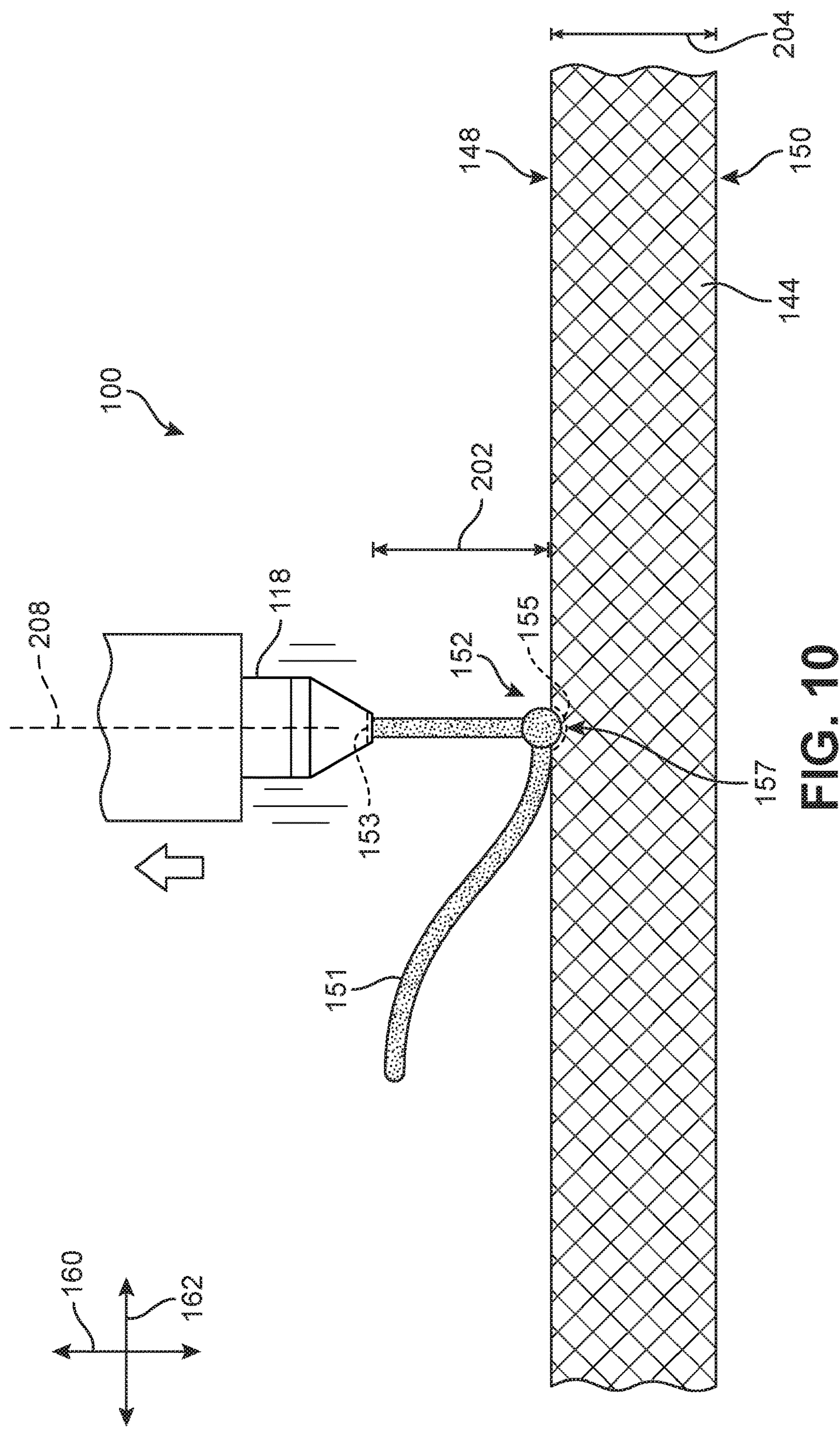
FIG. 10 is a schematic view of a process of raising a nozzle from the attachment region of FIG. 8, in accordance with an exemplary embodiment.

In some embodiments, raising the nozzle away from the attachment region may cause the base thickness between the upper surface and the lower surface to increase by an amount substantially equal to the prodding distance. As used herein, distances may be substantially equal when within 10 percent of each other. Referring to FIG. 10, base thickness 204 between attachment region 152 of upper surface 148 and lower surface 150 may increase by an amount substantially equal to prodding distance 206 (see FIG. 9). In some embodiments, the attachment region of the upper surface may be spaced from the lower surface by the base thickness after selectively attaching the yarn. Referring to FIG. 10, attachment region 152 of upper surface 148 may be spaced from lower surface 150 by base thickness 204 after selectively attaching yarn 151. In other embodiments, raising the nozzle away from the attachment region may cause the base thickness between the upper surface and the lower surface to increase by other amounts.

In those instances where a prodding distance is used, a prodding distance may be any suitable distance to facilitate an attachment of a yarn to a base. In some embodiments, the prodding distance may be less than the base thickness, which is further characterized below. In some embodiments, the prodding distance may be less than the thickness of the yarn, which is further characterized below. In some embodiments, the prodding distance may be less than the thickness of the melt-resistant material of the yarn, which is further characterized below. In other embodiments, the prodding distance may be different.

In those instances where a prodding distance may be less than the base thickness, the prodding distance may be less than the base thickness by any suitable amount. In some embodiments, the prodding distance may be less than three-quarters of the base thickness. In some embodiments, the prodding distance may be less than two-thirds of the base thickness. In some embodiments, the prodding distance may be less than half of the base thickness. In some embodiments, the prodding distance may be less than one-third of the base thickness. In some embodiments, the prodding distance may be less than one-quarter of the base thickness. In other embodiments, the prodding distance may be less than the base thickness by other amounts.

In those instances where a prodding distance may be less than the thickness of the yarn, the prodding distance may be less than the thickness of the yarn by any suitable amount. In some embodiments, the prodding distance may be less than three-quarters of the thickness of the yarn. In some embodiments, the prodding distance may be less than two-thirds of the thickness of the yarn. In some embodiments, the prodding distance may be less than half of the thickness of the yarn. In some embodiments, the prodding distance may be less than one-third of the thickness of the yarn. In some embodiments, the prodding distance may be less than one-quarter of the thickness of the yarn. In other embodiments, the prodding distance may be less than the thickness of the yarn by other amounts.

In those instances where a prodding distance may be less than the thickness of the melt-resistant material of the yarn, the prodding distance may be less than the thickness of the melt-resistant material of the yarn by any suitable amount. In some embodiments, the prodding distance may be less than three-quarters of the melt-resistant material of the yarn. In some embodiments, the prodding distance may be less than two-thirds of the melt-resistant material of the yarn. In some embodiments, the prodding distance may be less than half of the melt-resistant material of the yarn. In some embodiments, the prodding distance may be less than one-third of the melt-resistant material of the yarn. In some embodiments, the prodding distance may be less than one-quarter of the melt-resistant material of the yarn. In other embodiments, the prodding distance may be less than the melt-resistant material of the yarn by other amounts.

In those instances where the printing system lowers or moves the nozzle from the predetermined distance into the attachment region or into direct contact with the attachment region to facilitate an attachment of the yarn to a base, any suitable spacing between the nozzle and the lower surface may be used to facilitate an attachment of the yarn to the base. In some embodiments, the nozzle may be spaced apart from the lower surface while the nozzle descends into the attachment region. Referring to FIG. 9, printing system 100 may move or lower nozzle 118 along first axis 160 into attachment region 152 while spacing nozzle 118 apart from lower surface 150. In some embodiments, the nozzle is spaced apart from lower surface 150 during the moving or lowering of the nozzle into the attachment region by a spacing distance greater than the thickness of the yarn. In some embodiments, the spacing distance is greater than the thickness of the melt-resistant material of the yarn. In some embodiments, the spacing distance is greater than the thickness of the heat-moldable material of the yarn. Moreover, in some embodiments, the nozzle may not penetrate and/or pierce through the upper surface during the moving or lowering of the nozzle into the attachment region. Referring to FIG. 9, nozzle 118 does not penetrate or pierce through upper surface 148. In other embodiments, other spacing between the nozzle and the lower surface may be used to facilitate an attachment of the yarn to the base.

Figure 11:
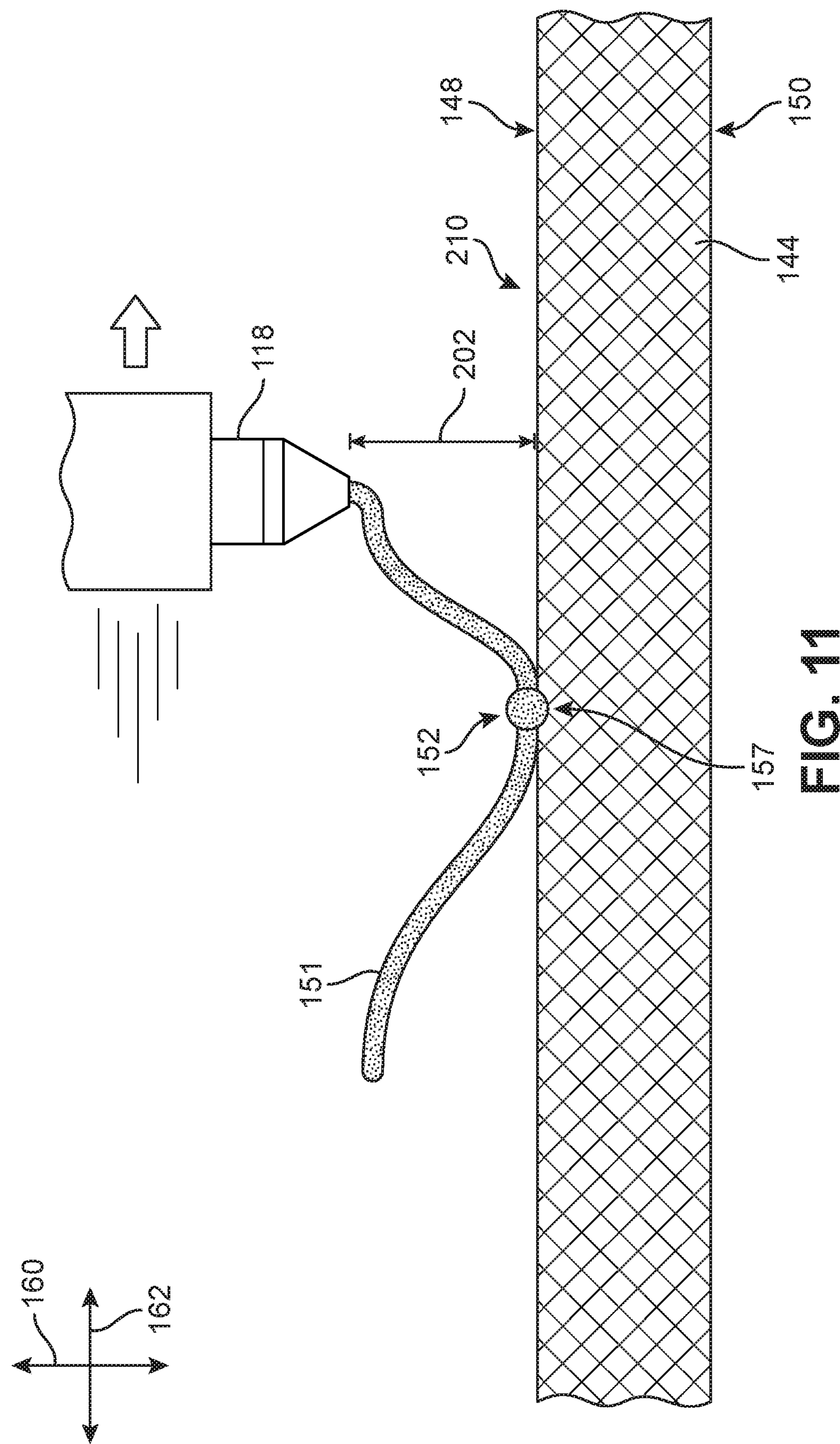
FIG. 11 is a schematic view of a process of moving a nozzle along an upper surface of a base and away from the attachment region of FIG. 8, in accordance with an exemplary embodiment.

Referring to FIG. 10, moving or lowering the nozzle into direct contact with the attachment region may place the yarn into direct contact with the attachment region to allow the yarn and the attachment region to bond. For example, moving or lowering nozzle 118 into direct contact with attachment region 152 may result in placing yarn 151 into direct contact with attachment region 152. Referring to FIG. 11, first portion 157 of heat-moldable material 156 (see FIG. 3) may transition from a liquid state to a solid state to bond attachment region 152.

In some embodiments, the nozzle may be raised after attaching the yarn to the upper surface. Referring to FIG. 10, printing system 100 may raise nozzle 118 along first axis 160 to predetermined distance 202 after attaching yarn 151 to attachment region 152. In other embodiments, the nozzle may be raised differently.

In those instances where the nozzle is raised along the first axis to the predetermined distance after attaching the yarn to the upper surface, the nozzle may maintain a base position along any number of axes. In some embodiments, the nozzle may maintain a base position along the second axis while raising the nozzle along the first axis. Referring to FIGS. 9 and 10, printing system 100 may maintain base position 208 along second axis 162 while raising nozzle 118 along first axis 160. In some embodiments, the nozzle maintains a base position along the third axis while raising the nozzle along the first axis. Referring to FIGS. 9 and 10, printing system 100 may maintain base position 208 along third axis 164 (see FIG. 1) while raising nozzle 118 along first axis 160. In some embodiments, the nozzle may maintain a base position along the second axis and along the third axis while raising the nozzle along the first axis. Referring to FIGS. 9 and 10, printing system 100 may maintain base position 208 along second axis 162 and along third axis 164 while raising nozzle 118 along first axis 160. In other embodiments, the nozzle may maintain a base position along one or more different number of axes.

In some embodiments, the printing system may be configured to permit selective attachment of a yarn onto any number of attachment regions and may position the yarn over any number of unattached regions. In some embodiments, the printing system moves the nozzle to another attachment region to facilitate selective attachment of the yarn to the base. Referring to FIG. 11, printing system 100 (see FIG. 1) may move nozzle 118 along second axis 162 and/or along third axis 164 (see FIG. 1) to attachment region 210.

In some embodiments, the nozzle may move along the upper surface toward an attachment region while maintaining the predetermined distance between the nozzle and the upper surface to allow detachment of the yarn from an unattached region. Referring to FIG. 11, printing system 100 may maintain predetermined distance 202 between nozzle 118 and upper surface 148. As such, yarn 151 may not be pushed into upper surface 148 to cause yarn 151 to bond with upper surface 148, thereby permitting for one or more unattached regions. In other embodiments, the nozzle may move along the upper surface toward an attachment region differently.

Figure 12:
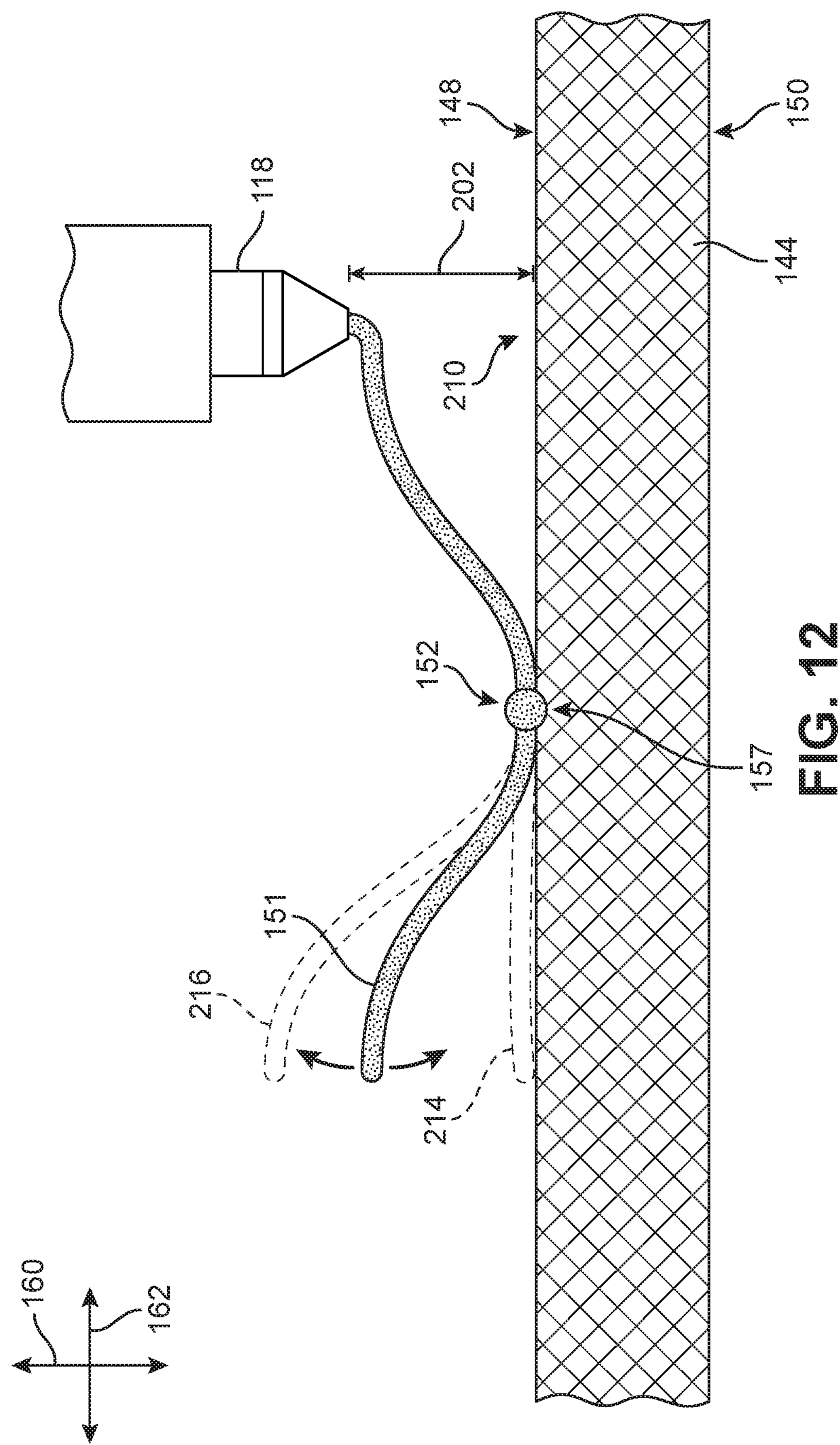
FIG. 12 is a schematic view of a yarn being flexibly moved away from an unattached region while maintaining an attachment at an attachment region of FIG. 8, in accordance with an exemplary embodiment.

In some embodiments, the unattached portion of the yarn can move freely. For example, yarn 151 may move freely between state 214 (adjacent the base) and state 216 (disposed away from the base) (see FIG. 12). Referring to FIG. 12, yarn 151 may directly contact upper surface 148 of base 144. In the example, yarn 151 may be spaced apart from upper surface 148 of base 144 in state 224 (see FIG. 17).

In some instances, it is desirable to prevent the yarn from separating from the base. In some embodiments, attachment of the yarn to one or more attachment regions may prevent the yarn from separating from the base. Referring to FIG. 12, attachment region 152 may prevent yarn 151 from separating from base 144.

In some embodiments, the attachment region may hold the yarn to the upper surface while the yarn freely moves between states. Referring to FIG. 12, attachment region 152 may hold yarn 151 to upper surface 148 while yarn 151 moves between state 214 and state 216.

Figure 13:
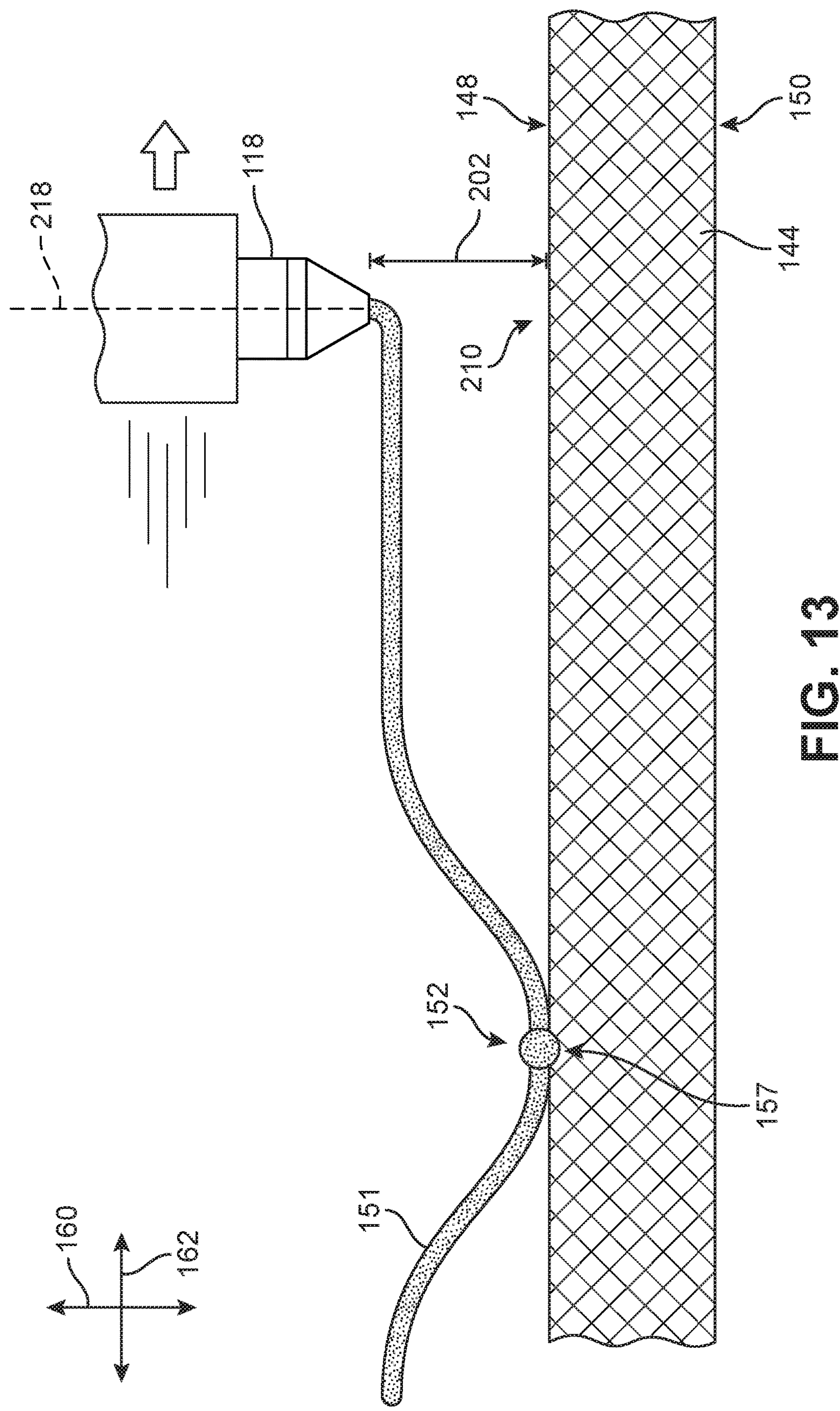
FIG. 13 is a schematic view of a process of moving a nozzle along an upper surface of a base and toward an attachment region, in accordance with an exemplary embodiment.

In certain instances, it is desirable to move a nozzle after attaching the yarn to the base to allow detachment of the yarn from an unattached region of the upper surface of the base. In some embodiments, the nozzle may move along the upper surface toward an attachment region while maintaining a predetermined distance between the nozzle and the upper surface to allow detachment of the yarn from an unattached region. Referring to FIG. 13, printing system 100 (see FIG. 1) maintains predetermined distance 202 between nozzle 118 and upper surface 148. As such, yarn 151 may not be pushed into the upper surface 148 to cause the yarn 151 to bond with upper surface 148, thereby allowing for one or more unattached regions. In other embodiments, the nozzle may be moved differently after attaching the yarn to the base.

Figure 14:
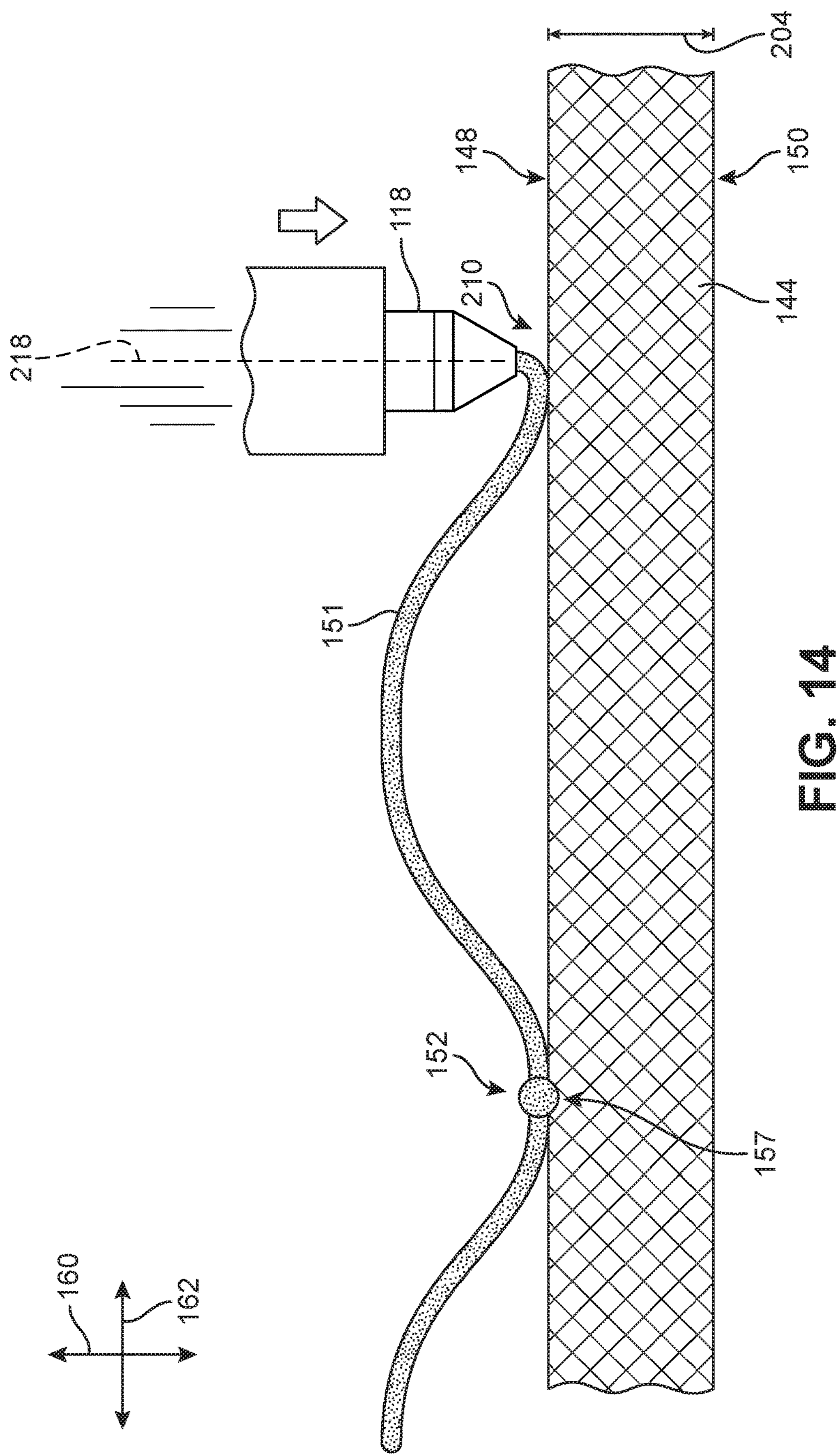
FIG. 14 is a schematic view of a process of lowering a nozzle into the attachment region of FIG. 13, in accordance with an exemplary embodiment.

In those instances where the nozzle may move along the upper surface toward an attachment region while maintaining a predetermined distance between the nozzle and the upper surface to allow detachment of the yarn from an unattached region, it may be desirable to attach the yarn to an attachment region of the base after allowing detachment of the yarn from an unattached region. In some embodiments, the printing system may move the nozzle from the predetermined distance into the attachment region to attach the yarn to an attachment region of the base after allowing detachment of the yarn from an unattached region. Referring to FIG. 14, printing system 100 (see FIG. 1) may move nozzle 118 from predetermined distance 202 (see FIG. 13) into attachment region 210. In some embodiments, the printing system may move the nozzle from the predetermined distance into direct contact with the attachment region. Referring to FIG. 14, printing system 100 may move nozzle 118 from predetermined distance 202 into direct contact with attachment region 210. In other embodiments, the nozzle may attach the yarn to the base differently after allowing detachment of the yarn from an unattached region.

In those instances where the printing system may move the nozzle from the predetermined distance into the attachment region to attach the yarn to an attachment region of the base after allowing detachment of the yarn from an unattached region, any suitable method to attach the yarn to an attachment region of the base may be used. In one embodiment, the nozzle may be moved or lowered along the first axis into the attachment region while maintaining a base position. Referring to FIGS. 13-14, printing system 100 may move or lower nozzle 118 along first axis 160 into attachment region 210. In some embodiments, the nozzle maintains the base position along the second axis while moving or lowering the nozzle into the attachment region. Referring to FIGS. 13-14, printing system 100 may maintain base position 218 along second axis 162 while moving or lowering nozzle 118 into attachment region 210. In some embodiments, the nozzle may maintain a base position along the third axis while moving or lowering the nozzle into the attachment region. Referring to FIGS. 13-14, printing system 100 may maintain base position 218 along third axis 164 (see FIG. 1) while moving or lowering nozzle 118 into attachment region 210. In some embodiments, the nozzle may maintain a base position along the second axis and along the third axis while moving or lowering the nozzle into the attachment region. Referring to FIGS. 13-14, printing system 100 may maintain base position 218 along second axis 162 and along third axis 164 while moving or lowering nozzle 118 into attachment region 210. In other embodiments, the yarn may be attached to the attachment region of the base differently.

Figure 15:
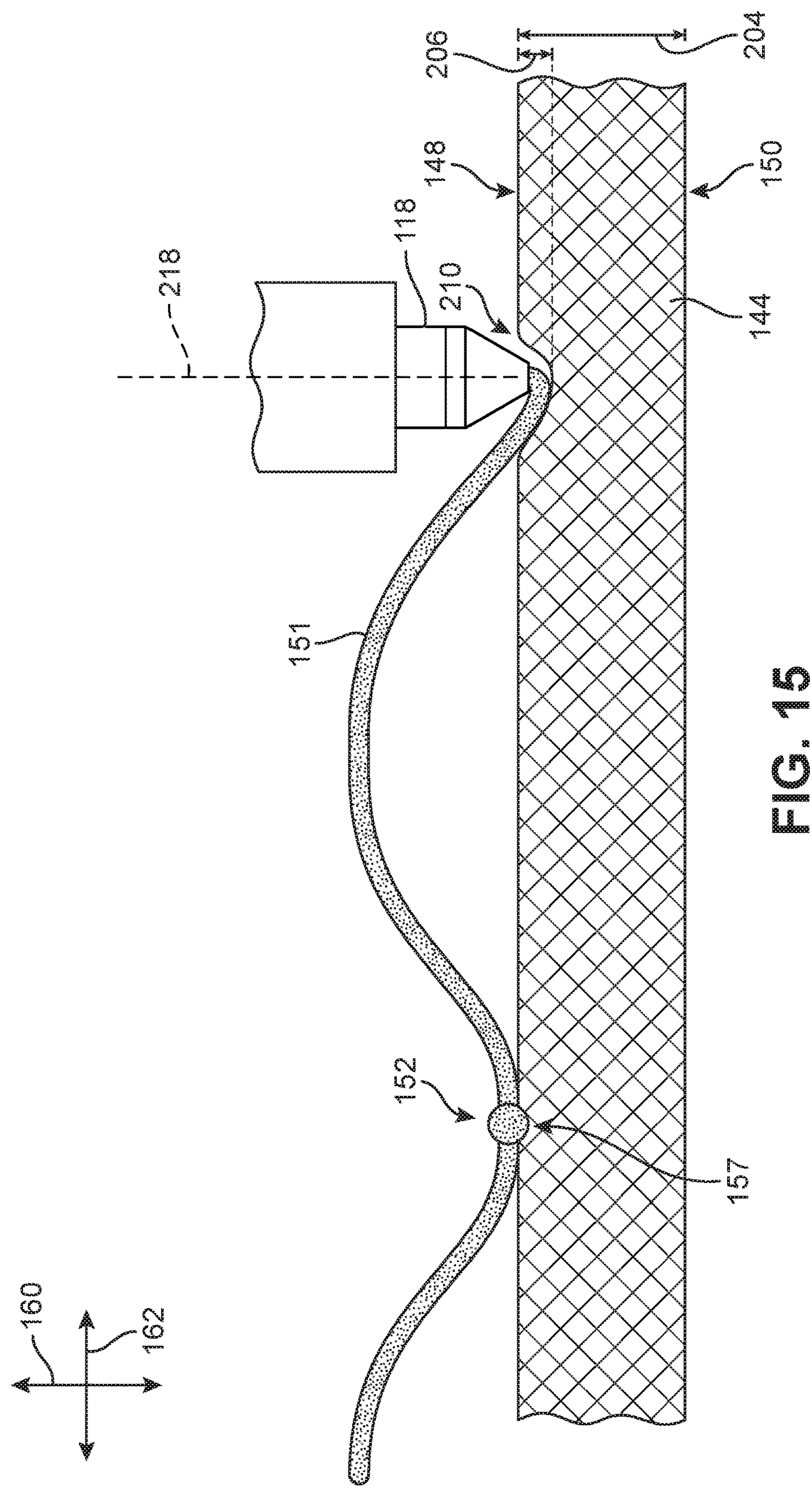
FIG. 15 is a schematic view of a process of lowering a nozzle into the attachment region of FIG. 13 to reduce a base thickness of a base, in accordance with an exemplary embodiment.

In certain embodiments, the printing system moves the nozzle from the predetermined distance into the attachment region such that a base thickness is reduced. Referring to FIG. 15, printing system 100 (see FIG. 1) lowers nozzle 118 into attachment region 210 such that base thickness 204 is reduced by prodding distance 206. In other embodiments, the printing system moves the nozzle from the predetermined distance into the attachment region without reducing a base thickness.

In those instances where the printing system moves the nozzle from the predetermined distance into the attachment region such that a base thickness is reduced, the base thickness may be reduced by any suitable amount. In some embodiments, the prodding distance for attaching a yarn to various attachment regions is the same. For example, as shown in FIGS. 9 and 15, prodding distance 206 for attaching yarn 151 to attachment region 210 is the same as prodding distance 206 for attaching yarn 151 to attachment region 152. In other embodiments, the prodding distance for attaching the yarn to various attachment regions is different.

Referring to FIG. 15, moving or lowering the nozzle into direct contact with the attachment region may place the yarn into direct contact with the attachment region to allow the yarn and the attachment region to bond. For example, moving or lowering nozzle 118 into direct contact with attachment region 210 may result in placing yarn 151 into direct contact with attachment region 210. In the example, second portion 159 of heat-moldable material 156 (see FIG. 3) may transition from a liquid state to a solid state to bond attachment region 210 (see FIG. 16).

Figure 16:
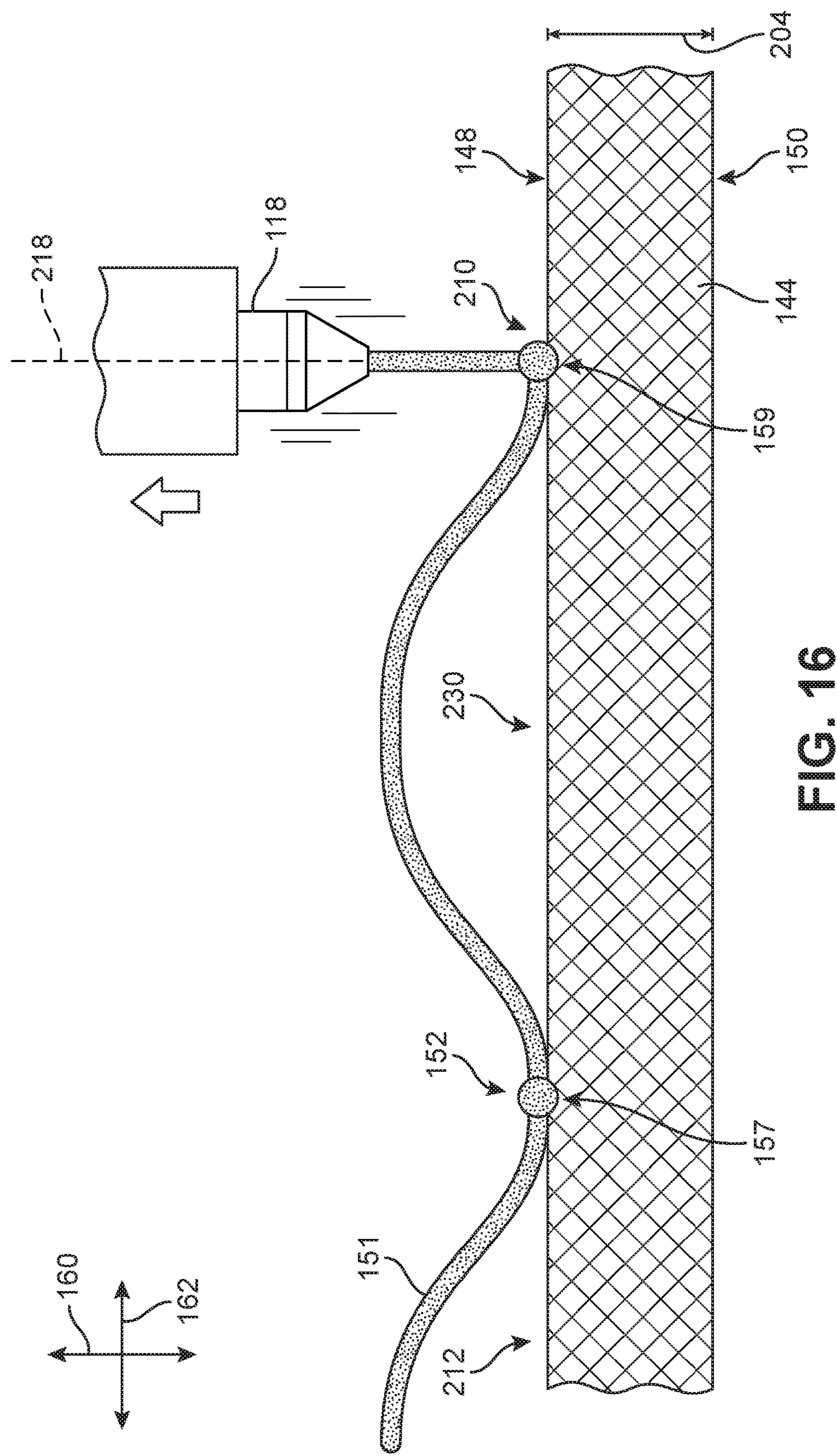
FIG. 16 is a schematic view of a process of raising a nozzle from the attachment region of FIG. 13, in accordance with an exemplary embodiment.

In some instances, it is desirable to raise the nozzle along the first axis to the predetermined distance after attaching the yarn to the upper surface. Referring to FIG. 16, printing system 100 (see FIG. 1) may raise nozzle 118 along first axis 160 to predetermined distance 202 (see FIG. 7) after attaching yarn 151 to attachment region 210. In some embodiments, the nozzle may maintain a base position along the second axis while raising the nozzle along the first axis. For example, printing system 100 may maintain base position 218 along second axis 162 while raising nozzle 118 along first axis 160. In some embodiments, the nozzle may maintain a base position along the third axis while raising the nozzle along the first axis. Referring to FIG. 16, printing system 100 may maintain base position 218 along third axis 164 (not shown) while raising nozzle 118 along the first axis 160. In some embodiments, the nozzle may maintain a base position along the second axis and along the third axis while raising the nozzle along the first axis. Referring to FIG. 16, printing system 100 may maintain base position 218 along second axis 162 and along third axis 164 while raising nozzle 118 along the first axis 160. In cases where the movement of the nozzle is characterized using a different coordinate system, the nozzle may maintain a base position along one or more different axes.

In some instances, it may be desirable to have a continuous segment of yarn extending from an attachment region to an unattached region. In some embodiments, an unattached region may be abutting an attachment region to facilitate a continuous segment of yarn extending from an attachment region to an unattached region. Referring to FIG. 16, unattached region 212 may be abutting attachment region 152. In the example, unattached region 230 may be abutting, or otherwise disposed proximate, attachment region 152. In the example, unattached region 230 is abutting attachment region 210. In other embodiments, an unattached region may be separated from an attachment region.

In those instances where an unattached region may be abutting an attachment region, a yarn may extend along any region of the upper surface. In some embodiments, the yarn may extend between abutting unattached regions and attachment regions. Referring to FIG. 16, yarn 151 may extend from unattached region 212 to attachment region 152. In the example, yarn 151 may extend from unattached region 230 to attachment region 152. In the example, yarn 151 may extend from unattached region 230 to attachment region 210. In other embodiments, the yarn may extend onto other regions of the upper surface of the base.

Figure 17:
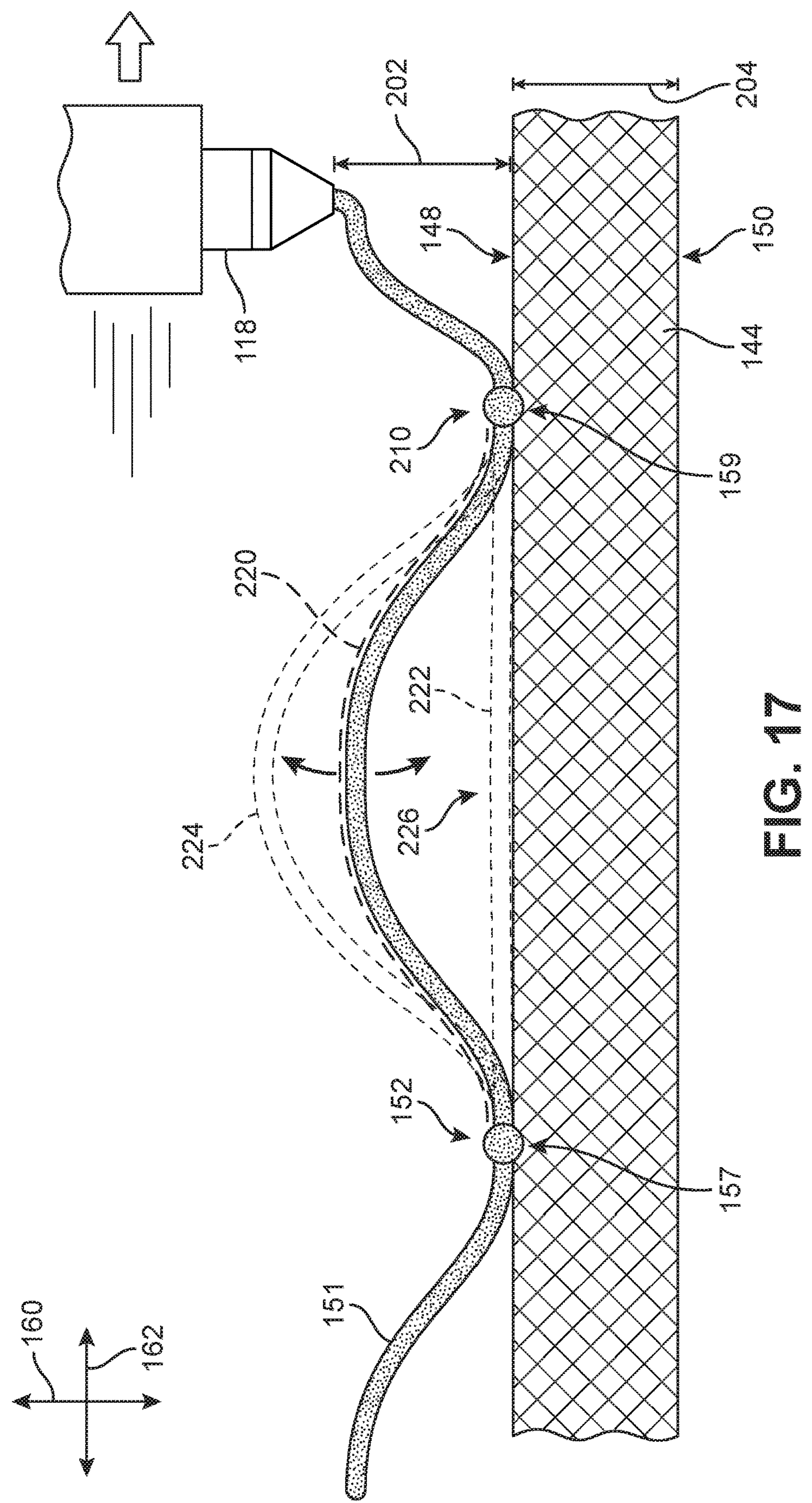
FIG. 17 is a schematic view of a yarn being flexibly moved away from an unattached region while maintaining an attachment at an attachment region of FIG. 8 and while maintaining an attachment at an attachment region of FIG. 13, in accordance with an exemplary embodiment.

In some embodiments, the printing system may move the nozzle away from the attachment region. Referring to FIG. 17, printing system 100 (see FIG. 1) may move nozzle 118 along second axis 162 and/or along third axis 164 (see FIG. 1) away from attachment region 210. In certain instances it is desirable to move the nozzle along upper surface 148 away from the attachment region while maintaining the predetermined distance between the nozzle and the upper surface to allow detachment of the yarn from an unattached region. Referring to FIG. 17, the printing system 100 may maintain predetermined distance 202 between nozzle 118 and upper surface 148. As such, yarn 151 may not be pushed into upper surface 148 to cause yarn 151 to bond with upper surface 148, thereby allowing for one or more unattached regions. In other embodiments, the printing system may move the nozzle away from the attachment region differently.

In some embodiments, the unattached portion of the yarn can move freely. For example, continuous segment 220 of yarn 151 may move freely between state 222 (adjacent the base) and state 224 (disposed away from the base and in a loop-like configuration). Referring to FIG. 17, continuous segment 220 may directly contact upper surface 148 and unattached region 226 in state 222. In the example, continuous segment 220 may be spaced apart from upper surface 148 and unattached region 226 in state 224.

In some instances, it is desirable to prevent the yarn from separating from the base. In some embodiments, attachment of the yarn to one or more attachment regions may prevent the yarn from separating from the base. Referring to FIG. 17, attachment region 152 and attachment region 210 may prevent yarn 151 from separating from base 144.

In some embodiments, the attachment region holds the yarn to the upper surface while the yarn freely moves between states. Referring to FIG. 17, attachment region 152 and attachment region 210 hold continuous segment 220 and yarn 151 to upper surface 148 while continuous segment 220 transitions between state 222 and state 224.

Figure 18:
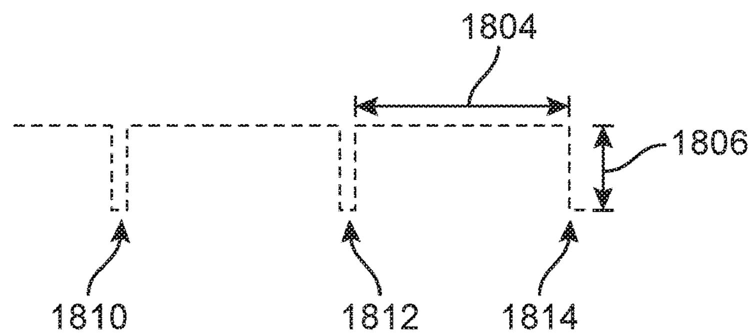
FIG. 18 is a schematic view of a process of moving the nozzle in relation to a base using a first separation distance and a first distance between attachment regions, in accordance with an exemplary embodiment.
Figure 19:
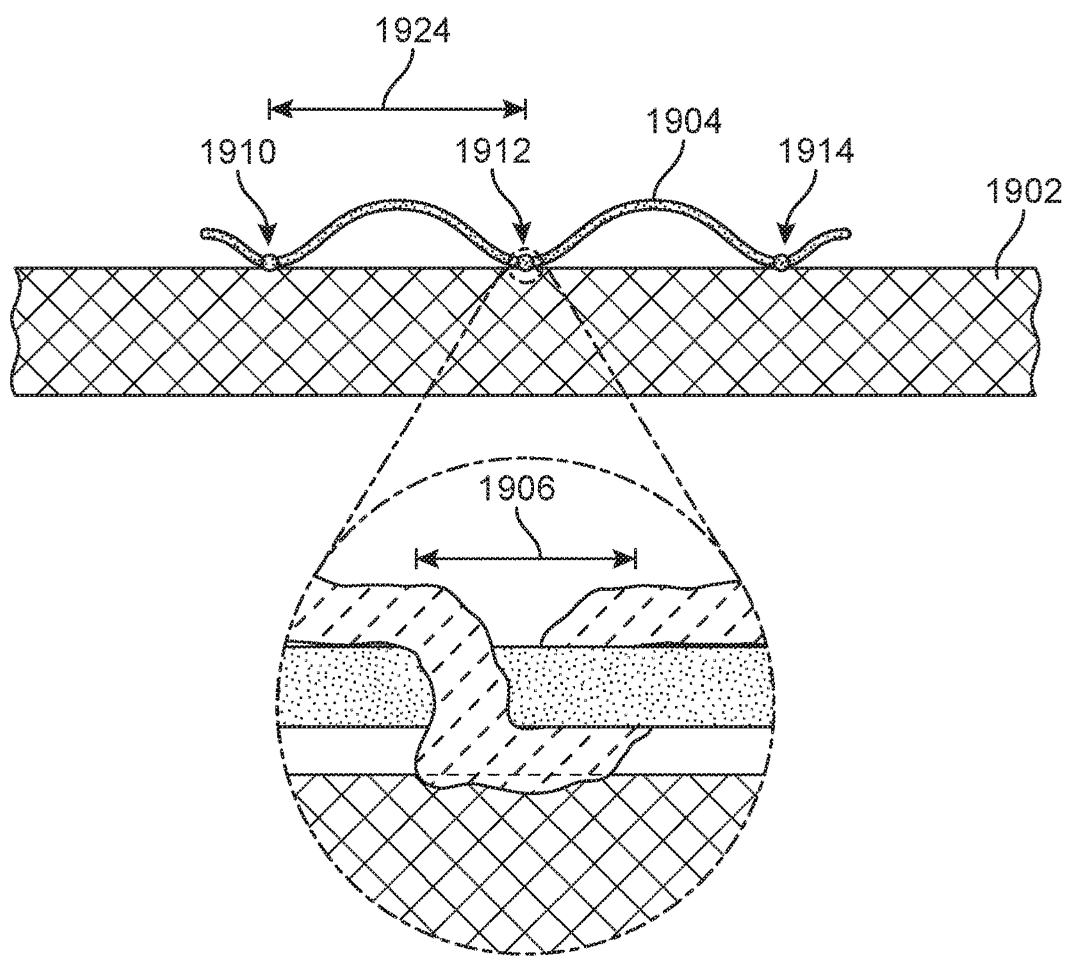
FIG. 19 is a schematic view of a yarn attached to the base using the process of FIG. 18, in accordance with an exemplary embodiment.

Some embodiments can include provisions to quickly attach a yarn to a base. In some cases, attachment regions may be spaced apart by an interval length. Referring to FIGS. 18 and 19, first attachment region 1910 of base 1902 may be formed by first step 1810 of lowering a nozzle and second attachment region 1912 of base 1902 may be formed by second step 1812 of lowering a nozzle. In the example, first step 1810 and second step 1812 may be spaced apart by interval length 1804, thereby resulting in first attachment region 1910 and second attachment region 1912 being spaced apart by first spacing 1924. In other cases, attachment regions may be abutting (see FIG. 23).

In those embodiments where attachment regions are spaced apart by an interval length, the interval length may have any suitable length to permit a printing process to quickly attach a yarn to a base. In some embodiments, the interval length may be greater than the width of an attachment region. Referring to FIGS. 18 and 19, interval length 1804 may be greater than width 1906 of first attachment region 1910. In other embodiments, the interval length may be different.

In some embodiments, a separation distance between a nozzle and a base may be less than an interval length. Referring to FIG. 18, separation distance 1806 may be less than interval length 1804. In other embodiments, the separation distance may be different.

In some embodiments, multiple pairs of attachment regions may be formed using a single separation distance. Referring to FIG. 18, separation distance 1806 may be used during first step 1810 of lowering a nozzle to form first attachment region 1910. In the example, separation distance 1806 may be used during second step 1812 of lowering a nozzle to form second attachment region 1912. In other embodiments, multiple pairs of attachment regions may be formed using different separation distances (see FIG. 20).

In some embodiments, multiple pairs of attachment regions may be spaced apart by a single interval length, which is further characterized below. In some embodiments, multiple pairs of attachment regions may be spaced apart by different interval lengths, which are further characterized below.

In those instances where multiple pairs of attachment regions may be spaced apart by a single interval length, any number of attachment regions may be used to facilitate a printing process to quickly attach the yarn to a base. Referring to FIGS. 18 and 19, third attachment region 1914 may be formed by third step 1814 of lowering a nozzle to attach yarn 1904. In the example, second step 1812 and third step 1814 may be spaced apart by interval length 1804. Thus, first attachment region 1910 and second attachment region 1912 may be spaced apart by interval length 1804 and second attachment region 1912 and third attachment region 1914 may be spaced apart by interval length 1804. In other embodiments, a different number of attachment regions may be spaced apart by a single interval length.

In those instances where multiple pairs of attachment regions may be spaced apart by different interval lengths, any suitable interval length may be used to facilitate a printing process to attach yarn to a base. In some embodiments, an interval length between different pairs of attachment regions may be reduced, which is further characterized below. In some embodiments, an interval length between different pairs of attachment regions may be increased, which is further characterized below.

Figure 20:
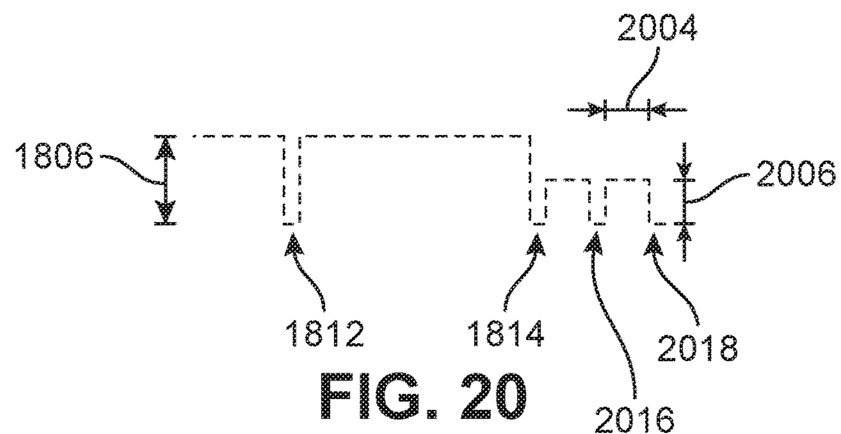
FIG. 20 is a schematic view of a process of moving the nozzle in relation to a base using a second separation distance and a second distance between attachment regions, in accordance with an exemplary embodiment.
Figure 21:
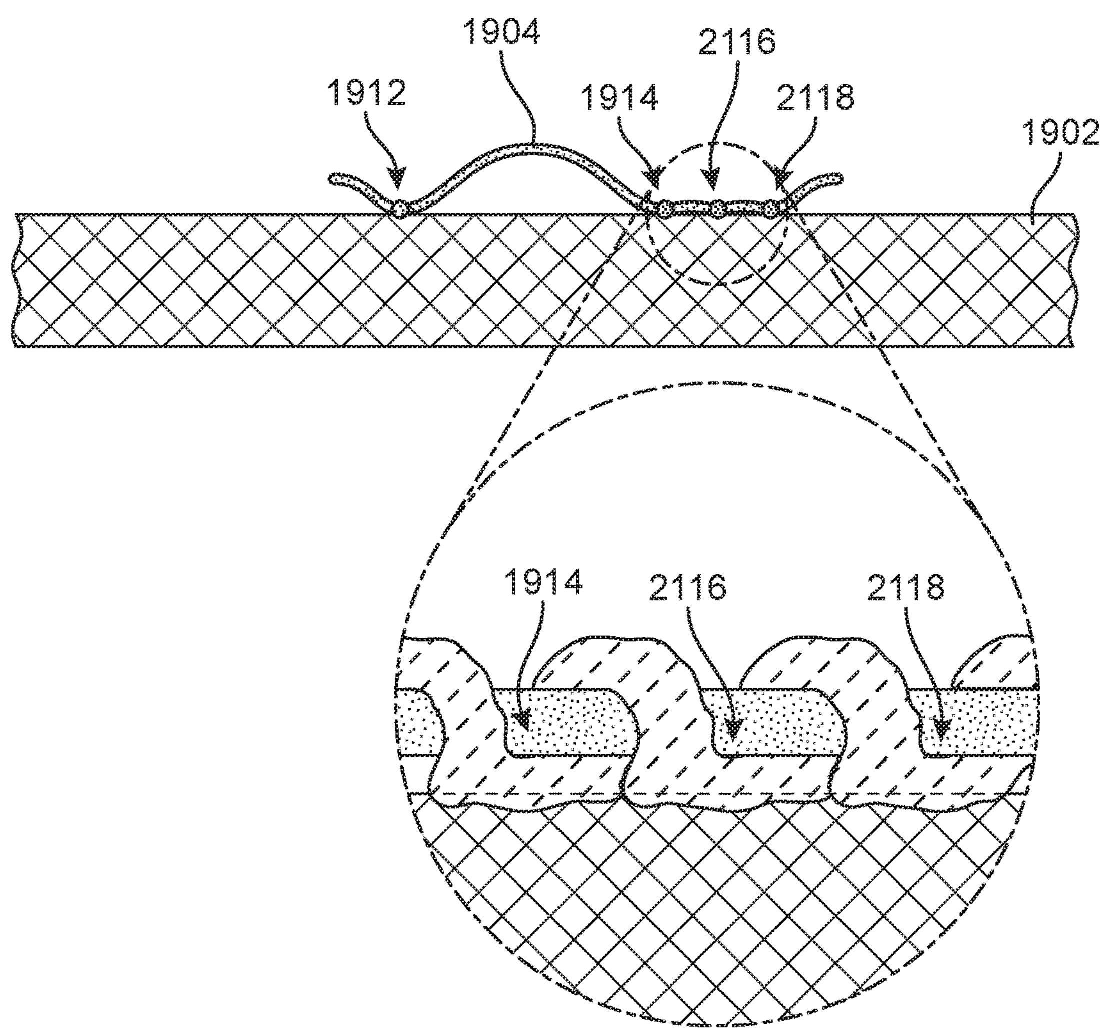
FIG. 21 is a schematic view of a yarn attached to the base using the process of FIG. 20, in accordance with an exemplary embodiment.

In those instances where an interval length between different pairs of attachment regions may be reduced, any suitable interval length may be used to facilitate a printing process to attach yarn to a base. In one embodiment, the interval length may be reduced such that adjacent attachment regions are abutting. Referring to FIGS. 20 and 21, fourth attachment region 2116 may be formed by fourth step 2016 of lowering a nozzle and fifth attachment region 2118 may be formed by fifth step 2018 of lowering a nozzle. In the example, fourth step 2016 and fifth step 2018 may be spaced apart by interval length 2004. Thus, fourth attachment region 2116 and fifth attachment region 2118 may be abutting, and third attachment region 1914 and fourth attachment region 2116 may be abutting while second attachment region 1912 and third attachment region 1914 are spaced apart by first spacing 1924 (see FIG. 19). In some embodiments, the interval length may be reduced such that adjacent attachment regions are spaced apart. For example, fourth step 2016 and fifth step 2018 may be spaced apart by an interval length such that fourth attachment region 2116 and fifth attachment region 2118 may be spaced apart by a second spacing (not shown). In other embodiments, the interval length may be reduced differently.

In some embodiments, multiple pairs of attachment regions may be formed using different separation distances. Referring to FIG. 20, separation distance 1806 may be used during second step 1812 of lowering a nozzle to form second attachment region 1912. In the example, separation distance 2006 may be used during fourth step 2016 of lowering a nozzle to form fourth attachment region 2116. In other embodiments, multiple pairs of attachment regions may be formed using a single separation distance.

In those embodiments where a continuous segment extends between attachment regions, the continuous segment may span any suitable length between attachment regions to facilitate an attachment of the yarn to a base. In some embodiments, the continuous segment may span between attachment regions being spaced apart by a single interval length (see FIG. 19). In other embodiments, the continuous segment may span between attachment regions being spaced apart by different interval lengths (see FIG. 21).

Figure 22:
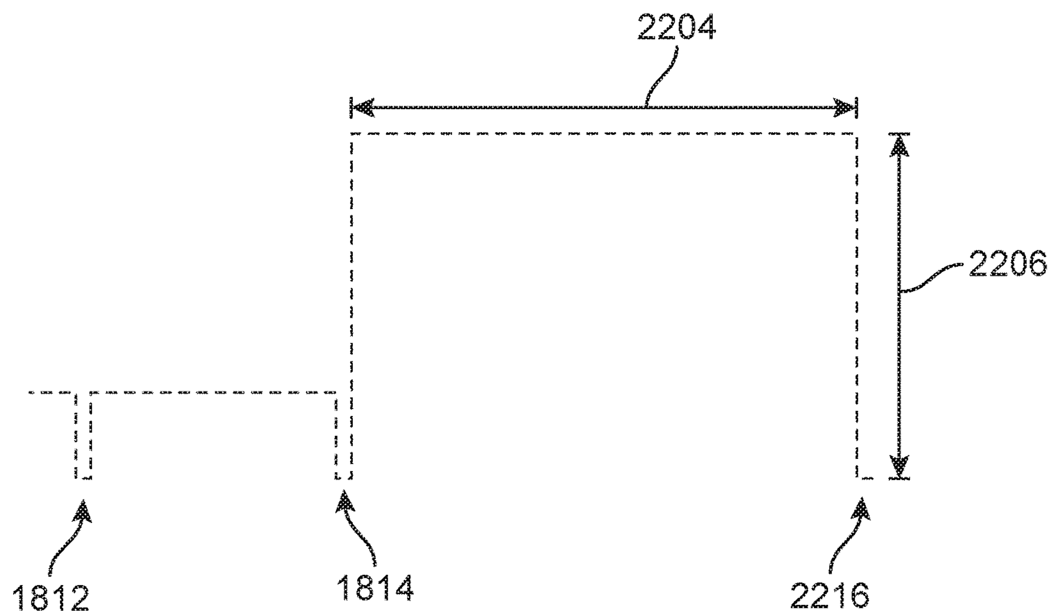
FIG. 22 is a schematic view of a process of moving the nozzle in relation to a base using a third separation distance and a third distance between attachment regions, in accordance with an exemplary embodiment.
Figure 23:
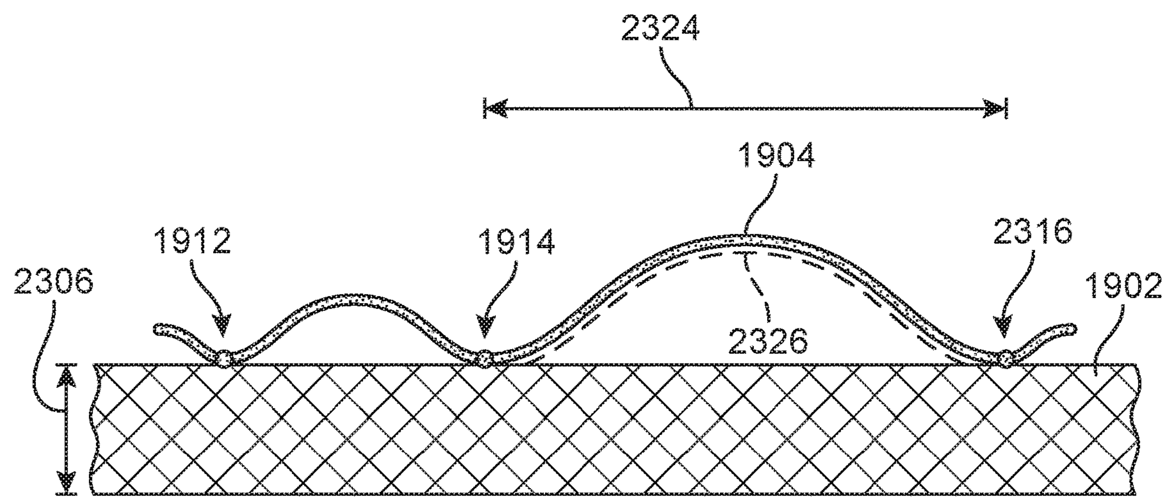
FIG. 23 is a schematic view of a yarn attached to the base using the process of FIG. 22, in accordance with an exemplary embodiment.

In those instances where an interval length between different pairs of attachment regions may be increased, any suitable interval length may be used to facilitate a printing process to attach the yarn to a base. In one embodiment, the interval length may be increased such that adjacent attachment regions are spaced apart by a length greater than the thickness of a base. Referring to FIGS. 22 and 23, fourth attachment region 2316 may be formed by fourth step 2216 of lowering a nozzle to attach yarn 1904. In the example, third step 1814 and fourth step 2216 may be spaced apart by interval length 2204. Thus, third attachment region 1914 and fourth attachment region 2316 may be spaced apart by second spacing 2324, which is greater than base thickness 2306. In other embodiments, the interval length may be increased differently.

Some embodiments can include provisions that permit slack in a yarn to facilitate the molding of the shape of yarn attached to a base. In some embodiments, a separation distance between a nozzle and a base may be sized to facilitate a use of a post. Referring to FIG. 22, separation distance 2206 may be less than span 2326 of yarn 1904 extending between third attachment region 1914 and fourth attachment region 2316. In the example, separation distance 2206 may permit slack in yarn 1904 to facilitate a molding of the shape of yarn attached to a base. In other embodiments, the separation distance between a nozzle and a base may be sized differently.

Figure 24:
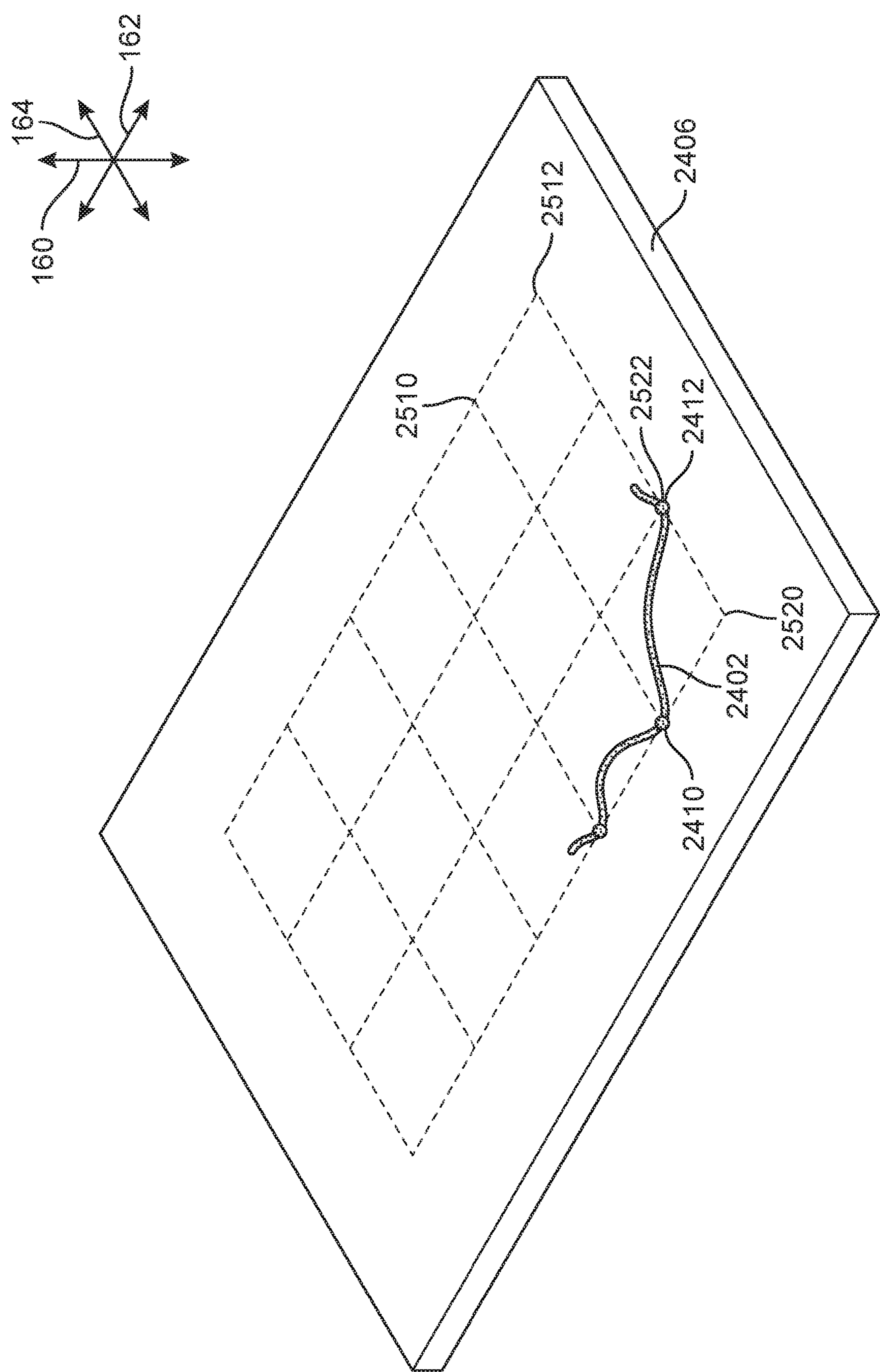
FIG. 24 is an isometric view of a yarn attached to the base, in accordance with an exemplary embodiment.

In some embodiments, the yarn may extend along a base along any number of axes. In some embodiments, the yarn may extend along multiple axes of a base. Referring to FIG. 24, yarn 2402 may extend along second axis 162 and may extend along third axis 164 of base 2406. In other embodiments, the yarn may extend along other directions.

In some embodiments, attachment regions of a base may be disposed in different positions along any number of axes. In some embodiments, attachment regions may be disposed in different positions along multiple axes of a base. Referring to FIG. 24, first attachment region 2410 extends on first width position 2510 of second axis 162, and second attachment region 2412 extends on second width position 2512 of second axis 162. In the example, first attachment region 2410 extends on first length position 2520 of third axis 164, and second attachment region 2412 extends on second length position 2522 of third axis 164. In other embodiments, attachment regions of a base may be disposed in other positions.

Figure 25:
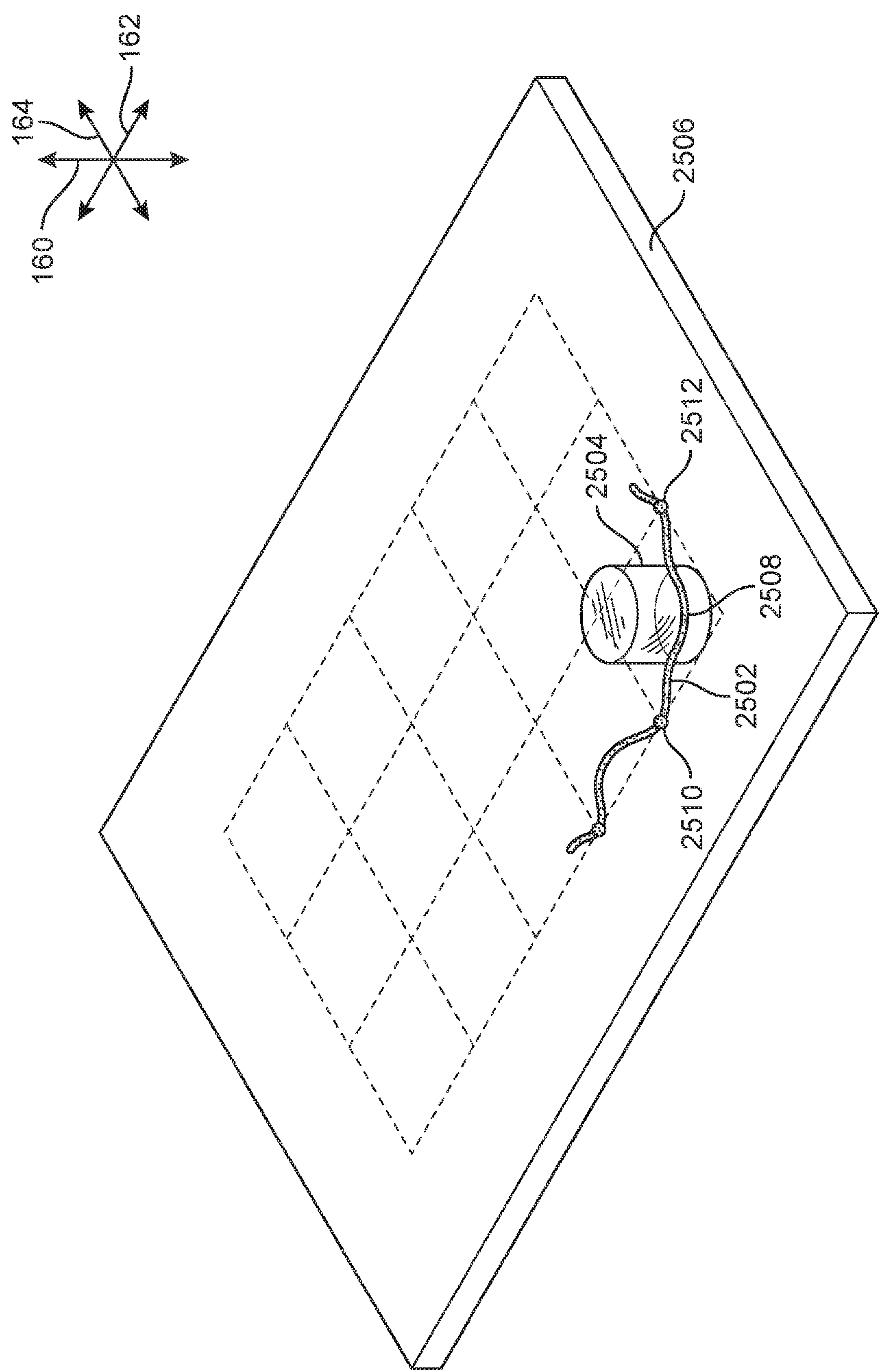
FIG. 25 is an isometric view of a yarn attached to the base using a post, in accordance with an exemplary embodiment.

Some embodiments can include provisions that permit the shaping of the yarn attached to a base. In one embodiment, a post may be used to shape the yarn. Referring to FIG. 25, one or more printing processes described above may be used to attach yarn 2502 onto base 2506 at first attachment region 2510 and at second attachment region 2512. In the example, yarn 2502 may be disposed to directly contact post 2504. In the example, the direct contact with post 2504 may create curved portion 2508 for yarn 2502 in the horizontal plane, thereby allowing yarn 2502 to travel in non-straight paths in the horizontal plane. In other embodiments, the shaping of the yarn attached to a base may be permitted using other components and/or methods.

Figure 26:
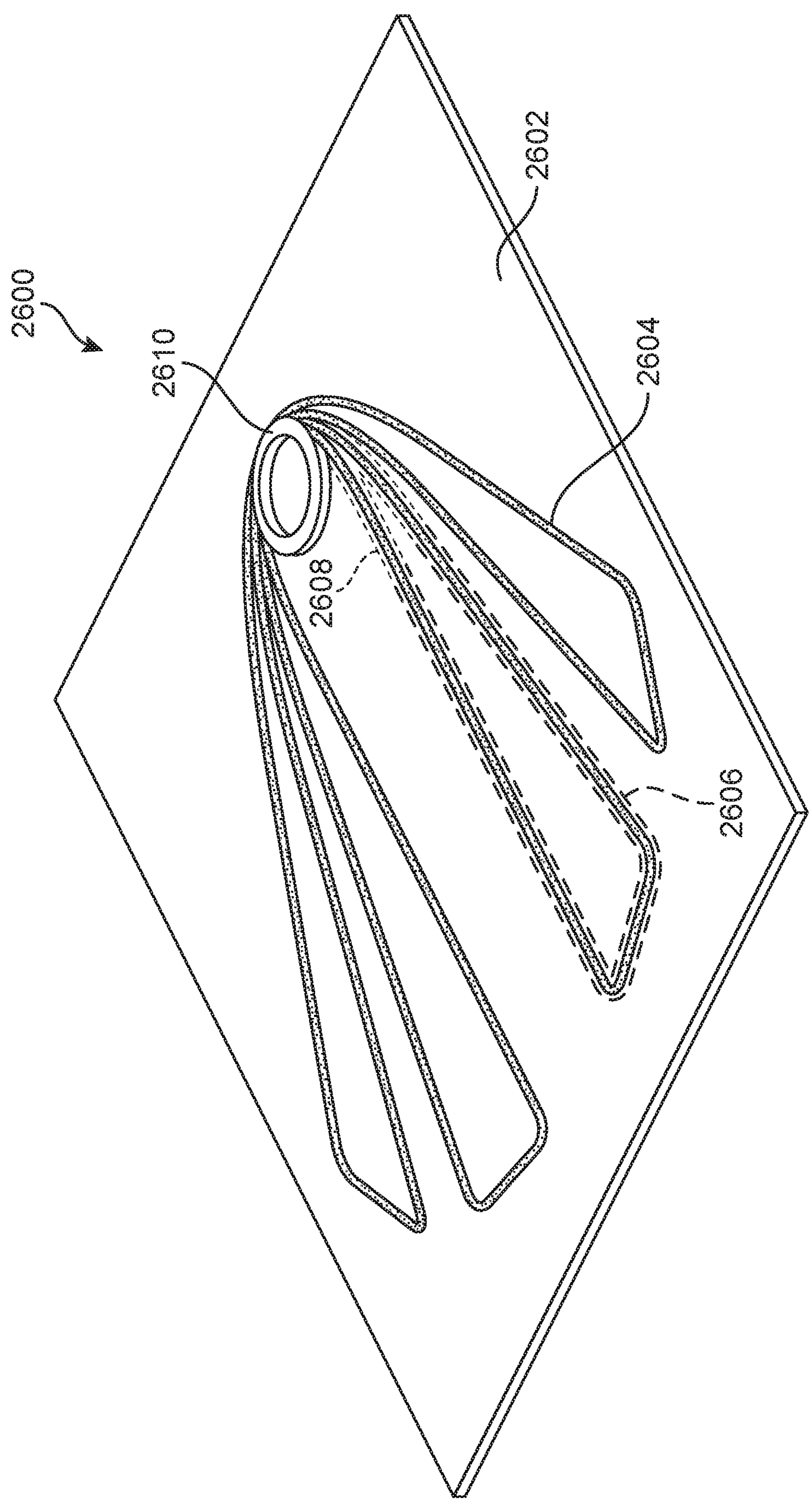
FIG. 26 is a schematic view of a yarn structure in an attached state, in accordance with an exemplary embodiment.
Figure 27:
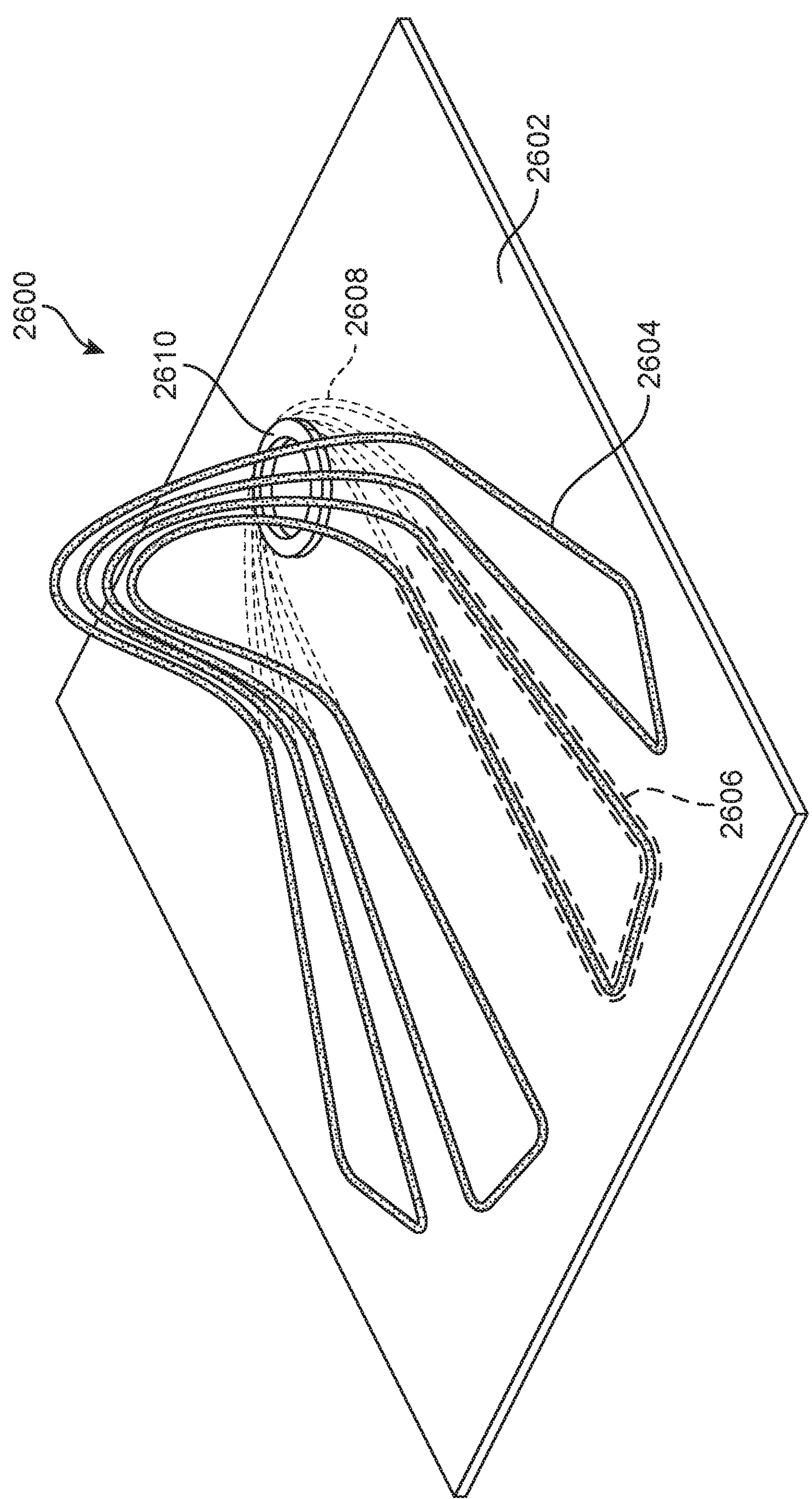
FIG. 27 is a schematic view of the yarn structure of FIG. 18 in a detached state, in accordance with an exemplary embodiment.

FIGS. 26-27 illustrate an exemplary article manufactured by one or more steps of the various embodiments. As shown in FIG. 26, article 2600 may include base 2602. Base 2602 may be, for example, a portion of a footwear, apparel, and the like. As shown, base 2602 may include yarn structure 2604. As previously noted, the various embodiments may allow for any number of attachment regions and unattached regions. As shown, base 2602 may include attachment region 2606 and unattached region 2608. Accordingly, as shown in FIG. 27, yarn structure 2604 may have a first state where yarn structure 2604 is attached to fastener 2610. Additionally, as shown in FIG. 27, yarn structure 2604 may have a second state where yarn structure 2604 and fastener 2610 are unattached.

One or more steps of the various embodiments may be used to manufacture various articles for various uses. For example, as shown in FIGS. 26-27, article 2600 may allow yarn structure 2604 to move over fastener 2610 without excessive slack in yarn structure 2604. Moreover, selective attachment of the yarn structure onto a base may simplify a manufacturing of an article by, for example, reducing manufacturing operations such as removing a release layer. In another example, a yarn structure is selectively attached in portions to restrict a stretch in a first axis while allowing a stretch in a second axis (not shown). In some examples, a yarn structure is selectively attached in portions for aesthetic purposes. For example, a yarn structure may be selectively attached to emphasize a logo, design, color, and the like.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

In a first embodiment, a method of printing a yarn onto a base may include the following steps:

dispensing the yarn from a nozzle of a printing system, the yarn including a heat-moldable material and a melt-resistant material, wherein the step of dispensing the yarn comprises dispensing the heat-moldable material in a liquid state and wherein the step of dispensing the yarn comprises dispensing the melt-resistant material in a solid state; and selectively attaching the yarn to an attachment region of the base by moving the nozzle along a first axis into the attachment region, wherein the first axis is approximately normal to an upper surface of the base, wherein the base has the upper surface spaced from a lower surface by a base thickness, wherein the step of moving the nozzle along the first axis into the attachment region reduces the base thickness by a prodding distance, and wherein the heat-moldable material bonds to the attachment region during a transition of the heat-moldable material from the liquid state to a solid state of the heat-moldable material.

In a second embodiment, the heat-moldable material of the first embodiment of the method of printing may bond to the melt-resistant material during the transition of the heat-moldable material from the liquid state to the solid state.

In a third embodiment, the methods of printing of any of the first or second embodiments may include a prodding distance that is less than half the base thickness.

In a fourth embodiment, the methods of printing of any one of the first through the third embodiments may further include the yarn having a yarn thickness, wherein the prodding distance is less than twice the yarn thickness.

In a fifth embodiment, the methods of printing as in any one of first through the fourth embodiments may further include the step of moving the nozzle along the first axis away from the attachment region after selectively attaching the yarn, wherein the attachment region is spaced apart from the lower surface by the base thickness after the step of moving the nozzle along the first axis away from the attachment region.

In a sixth embodiment, the methods of printing as in any one of the first through the fifth embodiments may further include the step of moving the nozzle along a second axis toward an unattached region after selectively attaching the yarn, wherein the second axis is approximately parallel with the upper surface of the base, and wherein a continuous segment of the yarn extends from the attachment region to the unattached region after moving the nozzle along the second axis toward the unattached region.

In a seventh embodiment, the methods of printing as in any one of the first through the sixth embodiments may further include the nozzle having a tip area, wherein the attachment region has a surface area approximately equal to the tip area.

In an eighth embodiment, a method of printing onto a base comprises the steps of:

positioning a nozzle of a printing system above an upper surface of the base, dispensing a yarn from the nozzle, wherein the upper surface includes at least a first attachment region and a second attachment region for bonding the yarn to the base, wherein the yarn includes a heat-moldable material and a melt-resistant material, wherein the step of dispensing the yarn comprises dispensing the heat-moldable material of the yarn in a liquid state and wherein the step of dispensing the yarn comprises dispensing the melt-resistant material of the yarn in a solid state, selectively attaching the yarn to the first attachment region by lowering the nozzle toward the first attachment region and into direct contact with the first attachment region, wherein a first portion of the heat-moldable material of the yarn transitions from the liquid state to a solid state of the heat-moldable material after the yarn contacts the first attachment region, thereby bonding the yarn to the first attachment region; and selectively attaching the yarn to the second attachment region by lowering the nozzle toward the second attachment region and into direct contact with the second attachment region, wherein a second portion of the heat-moldable material of the yarn transitions from the liquid state to the solid state of the heat-moldable material after the yarn contacts the second attachment region, thereby bonding the yarn to the second attachment region.

In a ninth embodiment of a method of printing as in the eighth embodiment, the step of lowering the nozzle toward the first attachment region comprises moving the nozzle only along an axis normal to the upper surface of the base.

In a tenth embodiment of a method of printing as in the ninth embodiment, the method further comprises the step of raising the nozzle away from the upper surface of the base after selectively attaching the yarn to the first attachment region.

In an eleventh embodiment of a method of printing as in the tenth embodiment, the method further comprises moving the nozzle along an axis parallel to the upper surface of the base toward the second attachment region.

In a twelfth embodiment of a method of printing as in the eleventh embodiment, the step of lowering the nozzle toward the second attachment region comprises moving the nozzle only along the axis normal to the upper surface of the base.

In a thirteenth embodiment of a method of printing as in the twelfth embodiment, a continuous segment of the yarn extends from the first attachment region to the second attachment region.

In a fourteenth embodiment of a method of printing as in any one of the eighth through the thirteenth embodiments, the first portion of the heat-moldable material is bonded to the melt-resistant material at the first attachment region and wherein the second portion of the heat-moldable material is bonded to the melt-resistant material at the second attachment region.

In a fifteenth embodiment, a system for printing onto a base comprises a yarn including a heat-moldable material and a melt-resistant material; a heating system configured to heat the yarn, wherein the heating system heats the yarn such that the heat-moldable material is in a liquid state and the melt-resistant material is in a solid state; a nozzle assembly configured to dispense the yarn onto the base, the base having an upper surface and a lower surface, wherein the nozzle assembly is configured to dispense the heat-moldable material of the yarn in the liquid state and the melt-resistant material of the yarn in the solid state; and an actuating system configured to lower the nozzle assembly into direct contact with a first attachment region of the upper surface and the actuating system configured to raise the nozzle assembly away from the first attachment region of the upper surface, wherein the actuating system is further configured to move the nozzle assembly along at least one axis parallel to the upper surface of the base, wherein a first portion of the heat-moldable material of the yarn is configured to transition from the liquid state to a solid state of the heat-moldable material while in direct contact with the first attachment region so that the first portion bonds to the first attachment region, and wherein the melt-resistant material of the yarn is configured to remain as a continuous segment extending from the nozzle assembly to the first attachment region during the transition of the first portion of the heat-moldable material from the liquid state to the solid state of the heat-moldable material.

In a sixteenth embodiment of a system for printing onto the base as in the fifteenth embodiment, the upper surface includes a first unattached region, wherein the actuating system is configured to provide the yarn over the first unattached region by moving the nozzle assembly along the axis parallel to the upper surface in a direction away from the first attachment region, and wherein the melt-resistant material of the yarn is configured to remain as the continuous segment extending from the nozzle assembly to the first unattached region after moving the nozzle assembly away from the first attachment region.

In a seventeenth embodiment of a system for printing as in the sixteenth embodiment, the first unattached region is disposed proximate the first attachment region.

In an eighteenth embodiment of a system for printing as in any one of the sixteenth or seventeenth embodiments, the upper surface includes a second attachment region, wherein the actuating system is configured to lower the nozzle assembly into direct contact with the second attachment region of the upper surface, thereby placing the yarn into direct contact with the second attachment region, wherein a second portion of the heat-moldable material of the yarn is configured to transition from the liquid state to the solid state of the heat-moldable material while in direct contact with the second attachment region so that the yarn bonds to the second attachment region, and wherein the melt-resistant material of the yarn is configured to remain as the continuous segment extending from the nozzle assembly to the second attachment region during the transition of the second portion of the heat-moldable material from the liquid state to the solid state of the heat-moldable material.

In a nineteenth embodiment of a system for printing as in the eighteenth embodiment, the base includes a post for shaping the yarn, and the actuating system is further configured to move the nozzle assembly from the first attachment region of the upper surface to the second attachment region of the upper surface such that the yarn is in direct contact with the post.

In a twentieth embodiment of a system for printing as in any one of the eighteenth or nineteenth embodiments, the upper surface includes a third attachment region, the actuating system is configured to lower the nozzle assembly into direct contact with the third attachment region of the upper surface, thereby placing the yarn into direct contact with the third attachment region, a third portion of the heat-moldable material of the yarn is configured to transition from the liquid state to the solid state of the heat-moldable material while in direct contact with the third attachment region so that the yarn bonds to the third attachment region, and the melt-resistant material of the yarn is configured to remain as the continuous segment extending from the nozzle assembly to the third attachment region during the transition of the third portion of the heat-moldable material from the liquid state to the solid state of the heat-moldable material.

In a twenty-first embodiment of a system for printing as in the twentieth embodiment, the first attachment region and the second attachment region are spaced further apart than the second attachment region and the third attachment region.

In a twenty-second embodiment of a system for printing as in any one of the eighteenth through the twenty-first embodiments, the actuating system is configured to lower the nozzle assembly a first separation distance into direct contact with the first attachment region of the upper surface, the actuating system is configured to lower the nozzle assembly a second separation distance into direct contact with the second attachment region of the upper surface, wherein the first separation distance and the second separation distance are different.

In a twenty-third embodiment of a system for printing as in any one of the fifteenth through the twenty-second embodiments, the continuous segment extending from the nozzle assembly to the first attachment region is spaced apart from the lower surface of the base.

In a twenty-fourth embodiment of a system for printing as in any one of the fifteenth through the twenty-third embodiments, the first portion of the heat-moldable material of the yarn is configured to bonds to the melt-resistant material of the yarn during the transition of the first portion of the heat-moldable material from the liquid state to the solid state of the heat-moldable material.

We claim:

1. A method of printing onto a base, comprising:

positioning a nozzle of a printing system above an upper surface of the base;

dispensing a yarn from the nozzle, the yarn including a heat-moldable material and a melt-resistant material;

selectively attaching a first portion of the yarn to a first attachment region of the upper surface of the base by lowering the nozzle toward the first attachment region so that the first portion of the yarn contacts and bonds to the first attachment region;

raising the nozzle away from the upper surface of the base after selectively attaching the first portion of the yarn to the first attachment region and moving the nozzle to a second attachment region; and selectively attaching a second portion of yarn to the second attachment region by lowering the nozzle toward the second attachment region so that the second portion of yarn contacts and bonds to the second attachment region;

wherein the yarn has a curved portion that is unattached to the upper surface and extends between the first attachment region and the second attachment region.

2. The method of claim 1, wherein moving the nozzle to a second attachment region comprises moving the nozzle in a non-straight path in a horizontal plane.

3. The method of claim 1, wherein moving the nozzle to a second attachment region comprises:

moving the nozzle around a structure that extends away from the upper surface of the base; and dispensing the yarn from the nozzle as the nozzle moves around the structure to form the curved portion.

4. The method of claim 3, wherein the method further comprises moving the curved portion from a first state in which the curved portion is attached to the structure to a second state in which the curved portion is not attached to the structure.

5. The method of claim 3, wherein the structure is a post member.

6. The method of claim 3, wherein the structure is a fastener.

7. The method of claim 1, wherein dispensing the yarn from the nozzle comprises dispensing the heat-moldable material of the yarn in a liquid state and dispensing the melt-resistant material of the yarn in a solid state.

8. The method of claim 7, wherein a first portion of the heat-moldable material of the yarn transitions from a liquid state to a solid state of the heat-moldable material after the yarn contacts the first attachment region to bond the yarn to the upper surface at the first attachment region, and a second portion of the heat-moldable material of the yarn transitions from the liquid state to the solid state of the heat-moldable material after the yarn contacts the second attachment region to bond the yarn to the upper surface at the second attachment region.

9. The method of claim 1, further comprising the step of raising the nozzle away from the upper surface of the base after selectively attaching the yarn to the first attachment region comprising moving the nozzle away from the upper surface in a direction perpendicular to the upper surface of the base.

10. A method of printing onto a base, comprising:

positioning a nozzle of a printing system above an upper surface of the base;

dispensing a yarn from the nozzle, the yarn including a heat-moldable material and a melt-resistant material;

selectively attaching the yarn to a first attachment region of the upper surface of the base by moving the nozzle to the first attachment region and bonding the yarn to the upper surface at the first attachment region;

moving the nozzle away from the upper surface of the base and along the upper surface away from the first attachment region;

selectively attaching the yarn to a second attachment region by lowering the nozzle toward the second attachment region and bonding the yarn to the second attachment region, the second attachment region being spaced apart from the first attachment region;

providing a portion of yarn between the first attachment region and the second attachment region that is unattached to the upper surface, the unattached portion of the yarn having a length that is greater than a distance between the first attachment region and the second attachment region; and shaping the unattached portion of the yarn between the first attachment region and the second attachment region so that the unattached portion of the yarn has a non-straight path along the upper surface of the base.

11. The method of claim 10, further comprising moving the unattached portion of the yarn around a structure that extends away from the upper surface of the base.

12. The method of claim 11, wherein the unattached portion has a curved shape between the first attachment region and the second attachment region.

13. The method of claim 11, wherein the method further comprises moving the unattached portion from a first state in which the unattached portion is secured to the structure to a second state in which the unattached portion is not secured to the structure.

14. The method of claim 11, wherein the structure is a post member.

15. The method of claim 11, wherein the structure is a fastener.

16. The method of claim 10, wherein bonding the yarn to the upper surface at the first and second attachment regions comprises moving the nozzle into direct contact with the first and second attachment regions, respectively.

17. The method of claim 16, wherein the heat-moldable material bonds to the first and second attachment regions during a transition of the heat-moldable material from a liquid state to a solid state of the heat-moldable material.

18. The method of claim 1, wherein the nozzle has a tip area, and each of the first and second attachment regions has a surface area that is approximately equal to the tip area.

* * * * *